(12) United States Patent
Kim

(10) Patent No.: US 11,202,504 B2
(45) Date of Patent: Dec. 21, 2021

(54) SLIDING DEVICE

(71) Applicant: SEGOS, Incheon (KR)

(72) Inventor: Ki Kwang Kim, Incheon (KR)

(73) Assignee: SEGOS, Incheon (KR)

( * ) Notice: Subject to any disclaimer, the term of this patent is extended or adjusted under 35 U.S.C. 154(b) by 0 days.

(21) Appl. No.: 16/754,522

(22) PCT Filed: Oct. 10, 2018

(86) PCT No.: PCT/KR2018/011903
§ 371 (c)(1),
(2) Date: Apr. 8, 2020

(87) PCT Pub. No.: WO2019/074271
PCT Pub. Date: Apr. 18, 2019

(65) Prior Publication Data
US 2020/0345139 A1    Nov. 5, 2020

(30) Foreign Application Priority Data

Oct. 12, 2017   (KR) .................. 10-2017-0132707
Oct. 12, 2017   (KR) .................. 10-2017-0132708
May 24, 2018   (KR) .................. 10-2018-0059141

(51) Int. Cl.
*A47B 88/493*    (2017.01)
*A47B 88/457*    (2017.01)
*A47B 88/437*    (2017.01)
*F16H 19/04*    (2006.01)
*F16H 19/06*    (2006.01)

(52) U.S. Cl.
CPC .......... *A47B 88/493* (2017.01); *A47B 88/437* (2017.01); *A47B 88/457* (2017.01);
(Continued)

(58) Field of Classification Search
CPC ....... A47B 88/44; A47B 88/45; A47B 88/437; A47B 88/447; A47B 88/457;
(Continued)

(56) References Cited

U.S. PATENT DOCUMENTS 3,323,853 A * 6/1967 Stark .................... A47B 88/487
312/331
5,399,010 A * 3/1995 McClung .............. E06B 3/5045
312/322
(Continued)

FOREIGN PATENT DOCUMENTS

KR    10-1098361 B1    12/2011
KR    10-1114481 B1    2/2012
(Continued)

*Primary Examiner* — Matthew W Ing
(74) *Attorney, Agent, or Firm* — Novick, Kim & Lee, PLLC; Jae Youn Kim

(57) ABSTRACT

A sliding device is capable of decreasing a moving distance of a middle rail while maintaining a maximum moving distance of a movable rail. The sliding device includes a fixed rail fixed to a body into which a storage body is inserted, the movable rail fixed to the storage body, the middle rail installed between the movable rail and the fixed rail and configured to move relatively with respect to the movable rail and the fixed rail, and a driving part configured to move the middle rail so as to move the movable rail by a distance twice a moving distance of the middle rail.

7 Claims, 25 Drawing Sheets

(52) U.S. Cl.
CPC .............. *F16H 19/04* (2013.01); *F16H 19/06*
(2013.01); *F16H 2019/0681* (2013.01)

(58) Field of Classification Search
CPC .......... A47B 88/493; A47B 2210/0064; A47B
2210/0067; A47B 2210/007; A47B
2210/0072; A47B 2210/0075; A47B
2210/0078; F16H 19/04; F16H 19/06;
F16H 2019/0681
See application file for complete search history.

(56) References Cited

U.S. PATENT DOCUMENTS

| | | | | |
|---|---|---|---|---|
| 5,492,400 | A | * | 2/1996 | Rock .................... A47B 88/493 |
| | | | | 312/331 |
| 5,564,807 | A | * | 10/1996 | Rock .................... A47B 88/467 |
| | | | | 312/331 |
| 2009/0241589 | A1 | * | 10/2009 | Yoo ....................... F25D 25/025 |
| | | | | 62/449 |
| 2010/0236279 | A1 | * | 9/2010 | Eom ..................... F25D 25/025 |
| | | | | 62/449 |
| 2011/0050061 | A1 | * | 3/2011 | Gasser ................. A47B 88/457 |
| | | | | 312/319.7 |
| 2017/0086584 | A1 | * | 3/2017 | Rehage ................. A47B 88/75 |
| 2017/0184151 | A1 | * | 6/2017 | Huang ................. F16C 29/008 |

FOREIGN PATENT DOCUMENTS

| | | |
|---|---|---|
| KR | 10-2012-0032555 A | 4/2012 |
| KR | 10-2012-0069910 A | 6/2012 |
| KR | 10-1594177 B1 | 2/2016 |

\* cited by examiner

O-D'

SLIDING DEVICE

TECHNICAL FIELD

The present invention relates to a sliding device, and more specifically, to a sliding device installed between a body and a storage body so that an opening and closing action of the storage body is smoothly performed.

BACKGROUND ART

A linear-type sliding device formed of a metal material is provided between a storage body and an inner wall of a body of a home appliance or furniture.

The sliding device includes a plurality of rails and balls or rollers provided between the rails, and moves smoothly relatively between the plurality of rails due to rolling actions of the balls or rollers.

Meanwhile, in a case in which a length of the storage body is increased, since a length and a total weight of the sliding device are also increased, the rail having a three-stage structure including a middle rail disposed between a movable rail coupled to the storage body and a fixed rail coupled to the body is typically used to stably support a load of a drawer while a withdrawing length of the drawer is secured when the drawer is withdrawn.

In the case in which the three-stage rail is used as described above, an automatic drawer withdrawing apparatus has been developed so that a rack gear is installed at a side of the fixed rail, a pinion gear engaged with the rack gear is installed at a side of the middle rail, and the pinion gear is driven using a motor to automatically drawn or withdrawn the storage body into or from the body due to the driving of the motor.

In the automatic drawer withdrawing apparatus, the rack gear is installed along an entire length of the fixed rail to maximally move the middle rail with respect to the fixed rail so as to secure an automatic withdrawing distance of the drawer when the drawer is withdrawn.

As described above, since the length of the rack gear is conventionally the same as the length of the fixed rail, there is a problem of increasing a manufacturing cost. In addition, since the motor should be driven such that the pinion gear moves along the entire rack gear having the long length as described above, a load applied to the motor is increased, and thus there are problems in that energy consumption increases, durability of the motor degrades, and a lifespan of the motor decreases.

In addition, since the sliding device has the three-stage structure, when the storage body performs a drawing or withdrawing action, the movable rail and the middle rail are moved on the fixed rail in a sliding manner. In this case, although the fixed rail is fixedly coupled to the body, a phenomenon occurs in which the movable rail and the middle rail shake laterally while moving in a sliding manner. When such a shake occurs, since the storage body bumps into the body, there are problems in that a bumping noise may be generated, the storage body or the body may be damaged, and thus the sliding device may be damaged.

DISCLOSURE

Technical Problem

The present invention is directed to providing a sliding device capable of decreasing a moving distance of a middle rail while maintaining a maximum moving distance of a movable rail.

In addition, the present invention is directed to providing a sliding device capable of preventing a movable rail and a middle rail from shaking laterally when the sliding device is driven.

Technical Solution

One aspect of the present invention provides a sliding device including a fixed rail fixed to a body into which a storage body is inserted, a movable rail fixed to the storage body, a middle rail installed between the movable rail and the fixed rail and configured to move relatively with respect to the movable rail and the fixed rail, and a driving part configured to move the middle rail so as to move the movable rail by a distance twice a moving distance of the middle rail.

In this case, the driving part may include a driving unit configured to move the middle rail, and a power transmission unit associated with the middle rail and the movable rail and configured to move the movable rail by the distance twice the moving distance of the middle rail.

More specifically, the driving unit may include a rack gear installed on the fixed rail and a pinion gear installed to be rotatable at one side of the middle rail and engaged with the rack gear.

In this case, the rack gear may also further include a stopper formed to protrude from a gear part at which the movable rail reaches a maximum withdrawn position to restrict the pinion gear from further rotating in a direction in which the movable rail is withdrawn.

In addition, the power transmission unit may also include a first roller rotatably coupled to one side of the middle rail, a second roller rotatably coupled to the other side of the middle rail, a first wire of which one side end is coupled to the movable rail and the other side end is coupled to the fixed rail and which is disposed to surround the first roller, and a second wire of which one side end is coupled to the movable rail and the other side end is coupled to the fixed rail and which is disposed to surround the second roller.

In this case, the first roller and the second roller may also be provided to have diameters less than a distance between the movable rail and the fixed rail to be disposed between the movable rail and the fixed rail.

Alternatively, the first roller and the second roller may also be provided to have diameters greater than a distance between the movable rail and the fixed rail to be in contact with side surfaces of the movable rail and the fixed rail.

In this case, the first roller and the second roller may also further include protrusions protruding toward the movable rail and the fixed rail to be in line contact with the movable rail and the fixed rail.

In addition, each of the first roller and the second roller may also include a first flange provided to have a diameter less than a distance between the movable rail and the fixed rail to be disposed between the movable rail and the fixed rail, a second flange formed to be spaced apart from the first flange and provided to have a diameter greater than the distance between the movable rail and the fixed rail to be disposed in contact with side surfaces of the movable rail and the fixed rail, and a guide groove which is formed between the first flange and the second flange and on which a wire is wound.

Another aspect of the present invention provides a sliding device including a power transmission unit which includes a roller rotatably coupled to the other side of the middle rail, a first wire of which one side end is coupled to the movable rail and the other side end is coupled to the fixed rail and which is disposed to surround a rotating shaft of the pinion gear, and a second wire of which one side end is coupled to the movable rail and the other side end is coupled to the fixed rail and which is provided to surround the roller.

In this case, the pinion gear may further include a flange part which extends from the rotating shaft in a radial direction and is spaced a predetermined distance from a gear part, and the first wire may also be disposed between the gear part and the flange part.

In addition, the flange part may also be provided to have a diameter greater than a distance between the movable rail and the fixed rail and may be disposed in contact with side surfaces of the movable rail and the fixed rail.

In this case, the flange part may also further include a protrusion protruding toward the movable rail and the fixed rail to be in line contact with the movable rail and the fixed rail.

In addition, a guide slit may be formed in a gear part of the pinion gear in a circumferential direction, and the first wire may also be disposed in the guide slit.

In this case, the pinion gear may also further include a protrusion protruding toward the movable rail and the fixed rail to be in line contact with the movable rail and the fixed rail.

In addition, the sliding device according to the embodiment of the present invention may also further include an automatic closing part which is hooked to a rotating shaft protruding outward from the pinion gear or unhooked from the rotating shaft to automatically close the middle rail when the middle rail is opened or closed.

Still another aspect of the present invention provides a sliding device including a driving part which includes a driving roller rotatably coupled to one side of the middle rail and having an outer circumferential surface on which gear teeth are formed, a guide roller rotatably coupled to the other side of the middle rail and having an outer circumferential surface on which gear teeth are formed, a belt having an inner circumferential surface on which gear teeth are formed, wherein the gear teeth are engaged with gear teeth of the driving roller and the guide roller, a first fixed portion provided on the movable rail and fixedly coupled to one side of the belt positioned at a side of the movable rail, and a second fixed portion provided on the fixed rail and fixedly coupled to the other side of the belt positioned at a side of the fixed rail.

Advantageous Effects

According to a sliding device of the present invention, there are effects in that, since a power transmission unit is provided to maintain a maximum moving distance of a movable rail and also decrease a moving distance of a middle rail, a manufacturing cost of components can be reduced, and since a load of a motor is decreased, energy can be saved and a lifespan of the motor can be increased.

In addition, according to the present invention, there are effects in that, when the sliding device is driven, since the movable rail and the middle rail are prevented from shaking laterally, generation of bumping noise can be prevented, and damage to the body, the storage body, and the sliding device can be prevented.

MODES OF THE INVENTION

Figure 1:
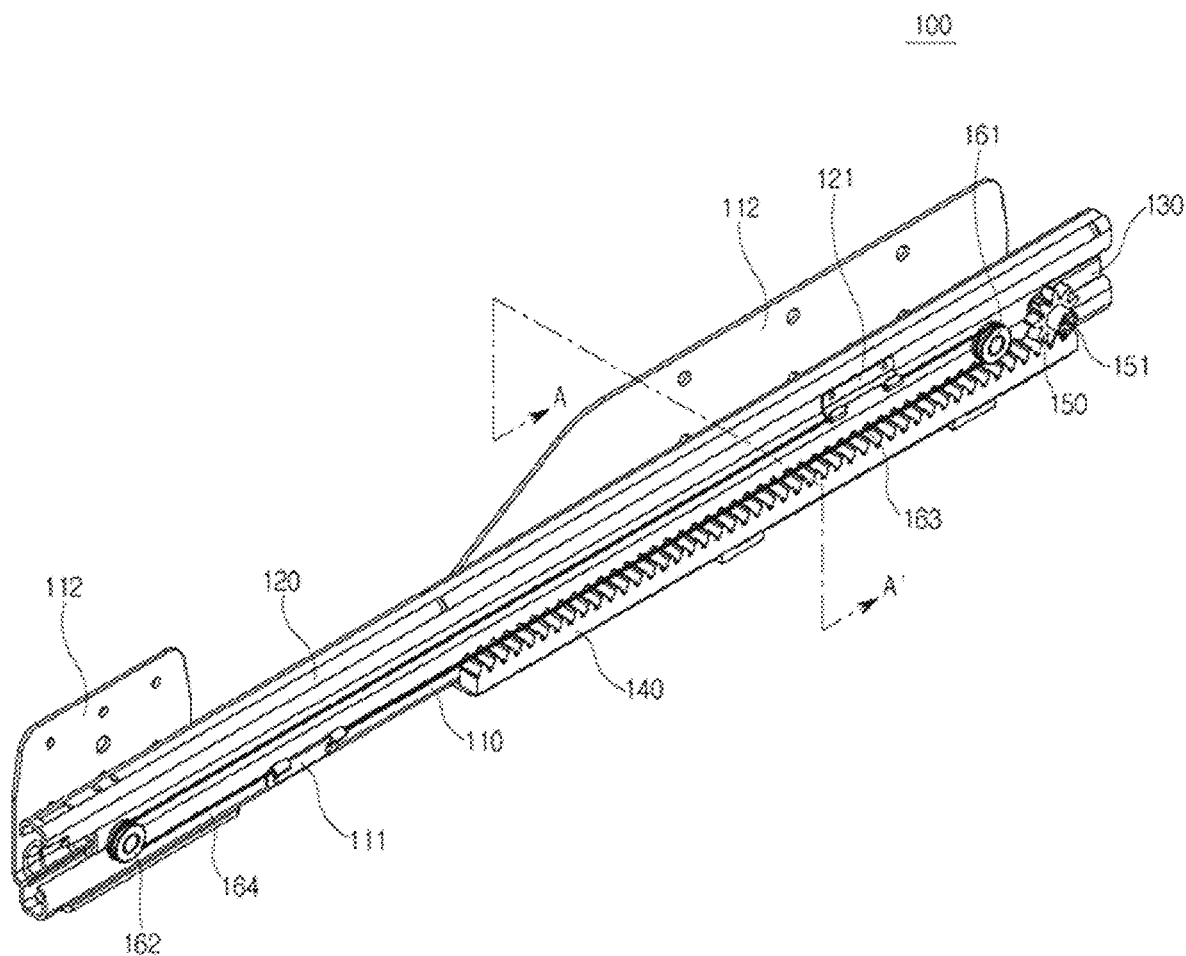
FIG. 1 is a schematic perspective view illustrating a sliding device according to a first embodiment of the present invention.

Hereinafter, a sliding device according to embodiments of the present invention will be described in more detail to promote an understanding of features of the invention.

When reference numerals are assigned to elements of each drawing accompanied to promote understanding of the embodiments which will be described below, and the same elements are illustrated in different drawings, it should be understood that the same reference numerals may be assigned to the same elements if possible. In addition, in the descriptions of the present invention, when detailed descriptions of related known configurations or functions are deemed to unnecessarily obscure the gist of the present invention, the detailed descriptions will be omitted.

Hereinafter, specific embodiments of the present invention will be described with reference to the accompanying drawings.

Figure 2:
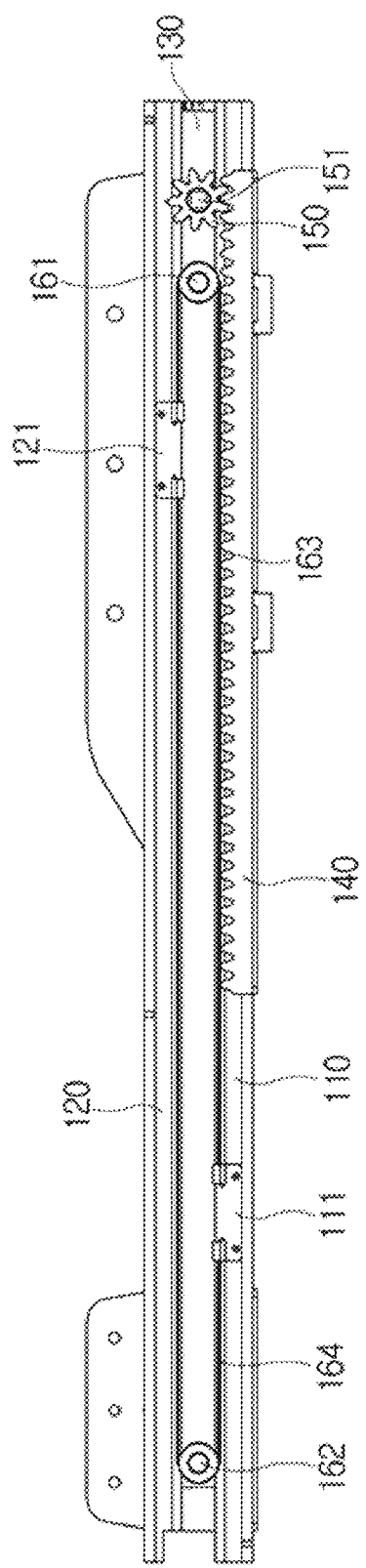
FIG. 2 is a schematic side view illustrating the sliding device according to the first embodiment of the present invention.
Figure 3:
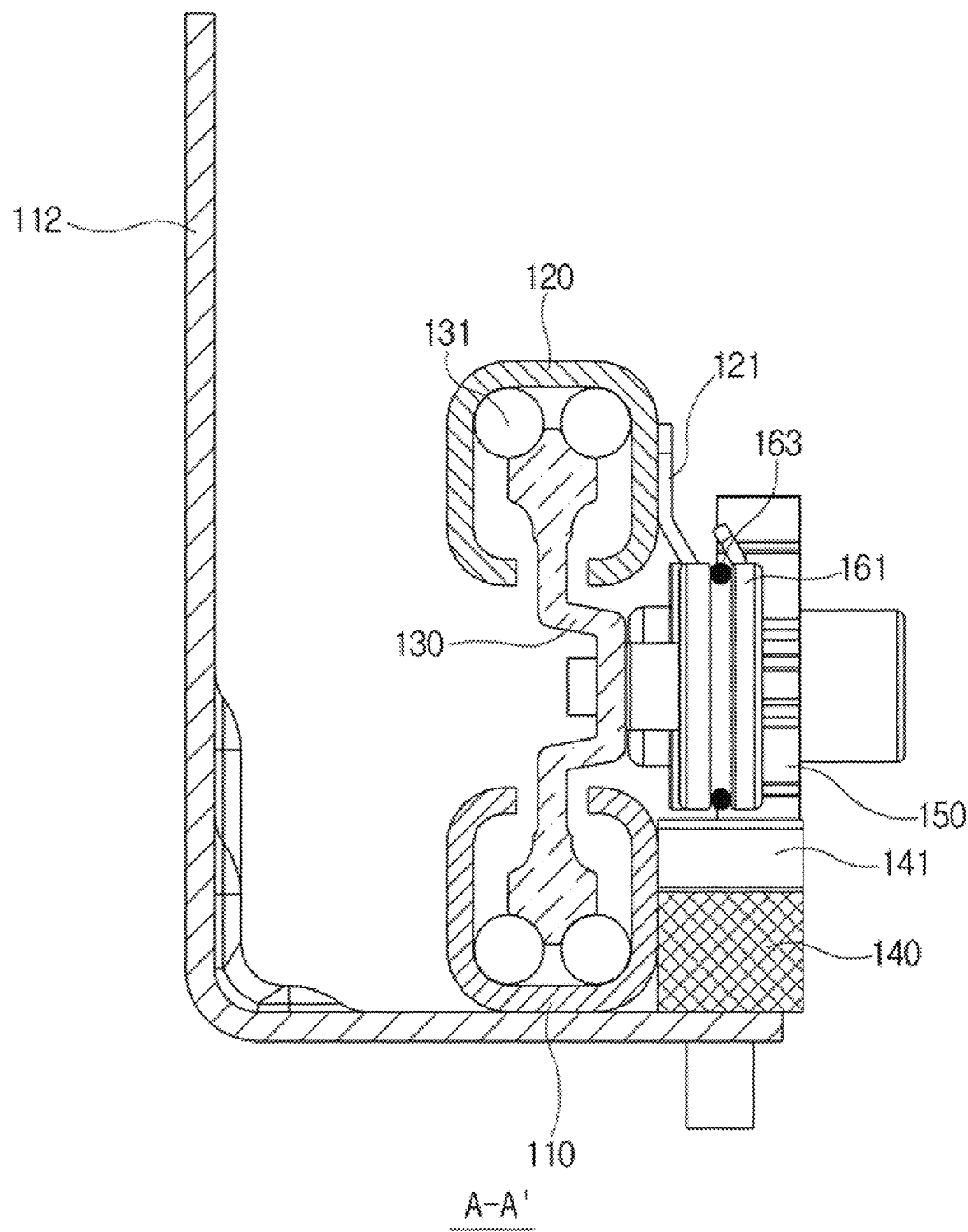
FIG. 3 is a schematic cross-sectional view taken along line A-A' of FIG. 1.
Figure 4:
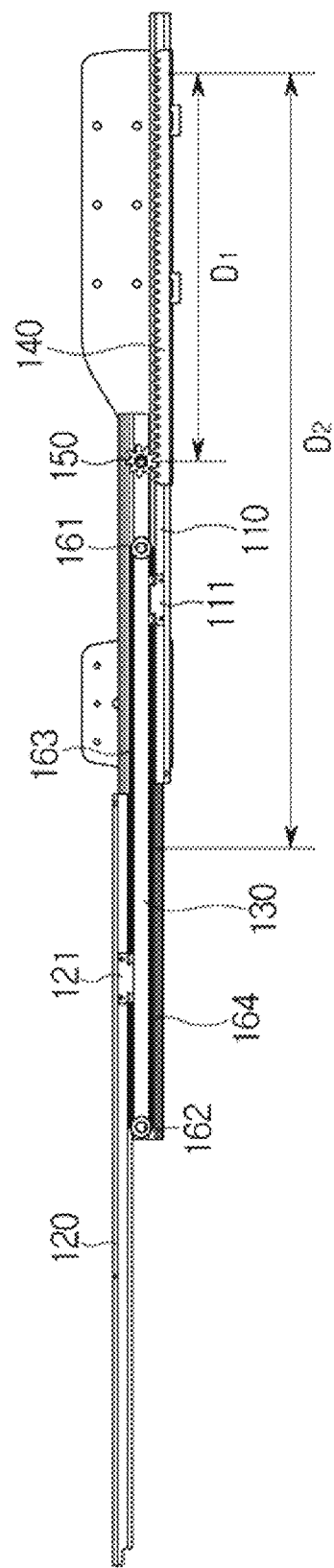
FIG. 4 is a schematic side view illustrating the sliding device according to the first embodiment of the present invention which operated to enter a withdrawn state.
Figure 5:
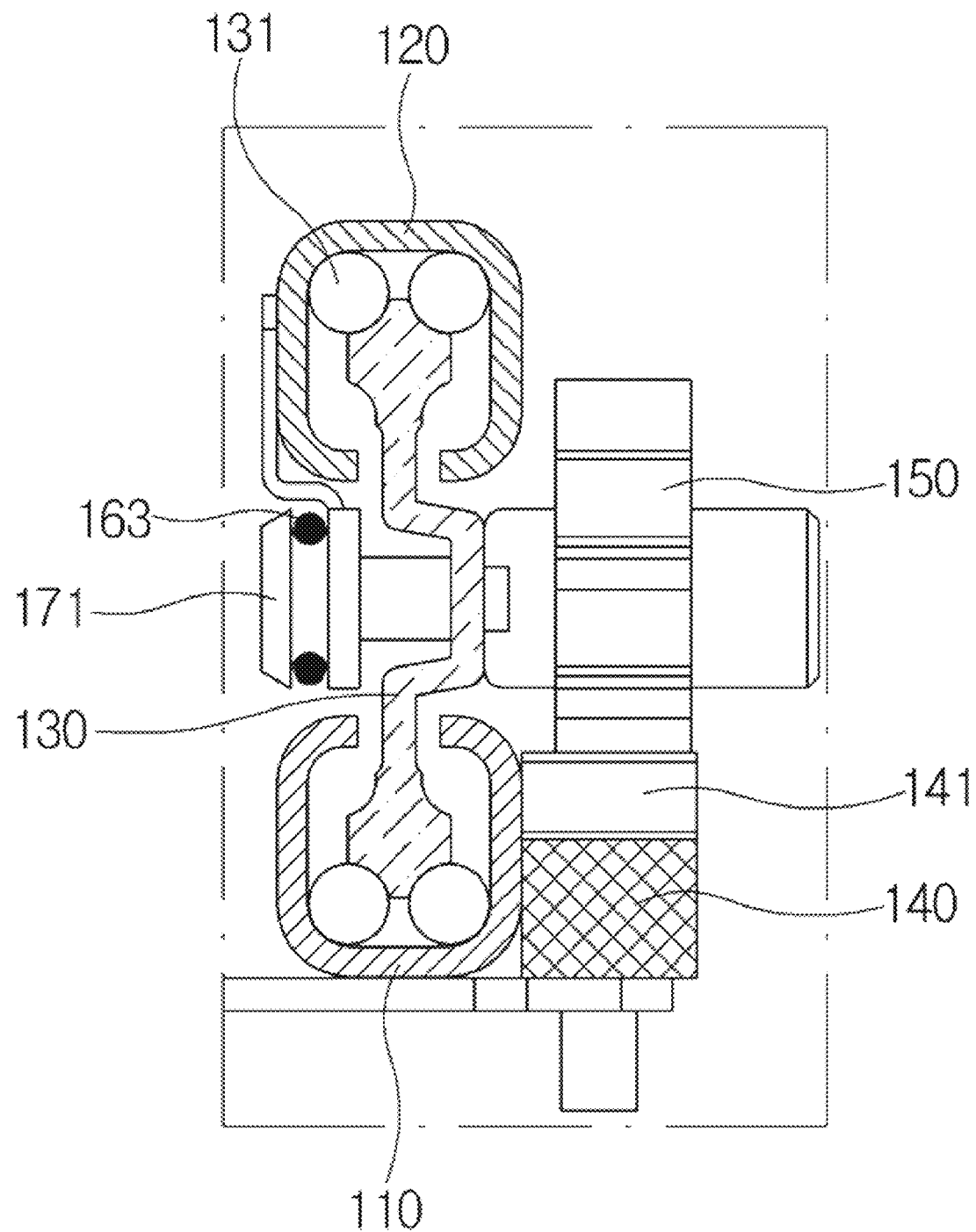
FIG. 5 is a schematic view illustrating another example of a power transmission unit of the sliding device according to the first embodiment of the present invention.

FIGS. 1 and 2 are schematic perspective and side views illustrating a sliding device according to a first embodiment of the present invention, FIG. 3 is a schematic cross-sectional view taken along line A-A' of FIG. 1, FIG. 4 is a schematic side view illustrating the sliding device which operated to enter a withdrawn state, and FIG. 5 is a schematic view illustrating another example of a power transmission unit of the sliding device.

Referring to FIGS. 1 to 4, a sliding device 100 according to the first embodiment of the present invention includes a fixed rail 110 fixed to a body (not shown) into which a storage body (not shown) is inserted, a movable rail 120 fixed to the storage body, a middle rail 130 disposed between the movable rail 120 and the fixed rail 110 and moved relatively with respect to the movable rail 120 and the fixed rail 11, and a driving part configured to move the middle rail 130 so as to move the movable rail 120 by a distance twice a moving distance D1 of the middle rail.

That is, as illustrated in FIG. 4, in the sliding device 100, when the driving part is operated to move the middle rail 130, the movable rail is moved by a moving distance D2 twice the moving distance D1 of the middle rail.

Accordingly, since a rack gear 140 may be provided to have a length which is half of a conventional length thereof, a manufacturing cost can be reduced, and since a driving distance of a pinion gear 150 is cut in half, a load applied to a driving motor (not shown) configured to drive the pinion gear 150 can be reduced, and thus energy can be saved and a lifespan of the driving motor can be increased.

More specifically, the fixed rail 110 is coupled to the body using a bracket 112, a position of the fixed rail 110 is fixed to the body, and the movable rail 120 is fixedly coupled to the storage body to guide movement of the storage body.

In addition, the middle rail 130 is disposed between the fixed rail 110 and the movable rail 120, a plurality of balls 131 are provided between the fixed rail 110 and the movable rail 120, and the middle rail 130, the fixed rail 110, and the movable rail 120 are moved relatively with respect to each other.

That is, the position of the fixed rail 110 is fixed to the body, and when the middle rail 130 is moved, the movable rail 120 is moved to correspond to the movement of the middle rail 130 so that the storage body may be drawn into or withdrawn from the body.

The driving part is provided to move the middle rail 130 and to move the movable rail 120 by a distance twice the moving distance D1 of the middle rail when the middle rail 130 is moved.

To this end, the driving part includes a driving unit configured to move the middle rail 130 and a power transmission unit associated with the middle rail 130 and the movable rail 120 and configured to move the movable rail 120 by a distance twice the moving distance D1 of the middle rail.

More specifically, the driving unit includes the rack gear 140 installed on the fixed rail 110 and the pinion gear 150 which is rotatably installed at one side of the middle rail 130, is engaged with the rack gear 140, receives rotational power of the driving motor, and moves the middle rail 130.

In this case, the rack gear 140 does not need to be provided along an entire length of the fixed rail 110 and is provided to have a length which is slightly greater than half of the length of the fixed rail 110 and fixedly coupled to the fixed rail 110. In addition, a coupling groove 151 is formed in the pinion gear 150 and a rotating shaft (not shown) of the driving motor is inserted into and coupled to the coupling groove 151 so that the pinion gear 150 receives rotational power of the driving motor.

The power transmission unit includes a first roller 161 rotatably coupled to one side of the middle rail 130, a second roller 162 rotatably coupled to the other side of the middle rail 130, a first wire 163 of which one side end is coupled to the movable rail 120 and the other side end is coupled to the fixed rail 110 and which is disposed to surround the first roller 161, and a second wire 164 of which one side end is coupled to the movable rail 120 and the other side end is coupled to the fixed rail 110 and which is disposed to surround the second roller 162.

In this case, a first coupling unit 121 is fixedly coupled to the movable rail 120 and a second coupling unit 111 is fixedly coupled to the fixed rail 110. That is, in a state in which one side end of the first wire 163 is coupled to the first coupling unit 121, after the first wire 163 surrounds the first roller 161, the other side end thereof is coupled to the second coupling unit 111. In addition, in a state in which one side end of the second wire 164 is coupled to the first coupling unit 121, after the second wire 164 surrounds the second roller 162, the other side end thereof is coupled to the second coupling unit 111.

With such a configuration, when the driving motor is operated to rotate the pinion gear 150 so as to withdraw the movable rail 120, the pinion gear 150 is moved forward along the rack gear 140, and in this case, the middle rail 130 is moved forward together. In addition, when the middle rail 130 is moved, since the second roller 162 is also moved together, the second wire 164 wound on the second roller 162 is pulled so that the movable rail 120 is also moved forward together.

In this case, as illustrated in FIG. 4, the movable rail moving distance D2 by which the movable rail 120 is moved is twice the middle rail moving distance D1 by which the middle rail 130 is moved.

Conversely, when the driving motor is operated to rotate the pinion gear 150 in a reverse manner so that the movable rail 120 is drawn into the body, the pinion gear 150 is moved backward along the rack gear 140, and in this case, the middle rail 130 is moved backward together. In addition, when the middle rail 130 is moved, since the first roller 161 is also moved together, the first wire 163 wound on the first roller 161 is pulled so that the movable rail 120 is also moved backward together.

In addition, as illustrated in FIGS. 1 to 4, the first roller 161 and the second roller 162 may be disposed to be coplanar with the pinion gear 150 at one side surface of the middle rail 130.

Alternatively, as illustrated in FIG. 5, a first roller 171 and a second roller may also be disposed on the other side surface of the middle rail 130 which is opposite to the one side surface on which the pinion gear 150 is disposed. In this case, the sliding device may be provided to be disposed in a shape in which a size of the sliding device is minimized. Since FIG. 5 is the schematic cross-sectional view illustrating only the first roller 171, but the second roller is also disposed to have the same shape as the first roller 171.

Referring to FIG. 5, the first roller 171 and the second roller are provided to have diameters less than a distance between the movable rail 120 and the fixed rail 110 so as to be disposed between the movable rail 120 and the fixed rail 110 and not to protrude outward from the movable rail 120 and the fixed rail 110.

Accordingly, the size of the sliding device can be minimized and thus interference with the other components can be minimized.

Figure 6:
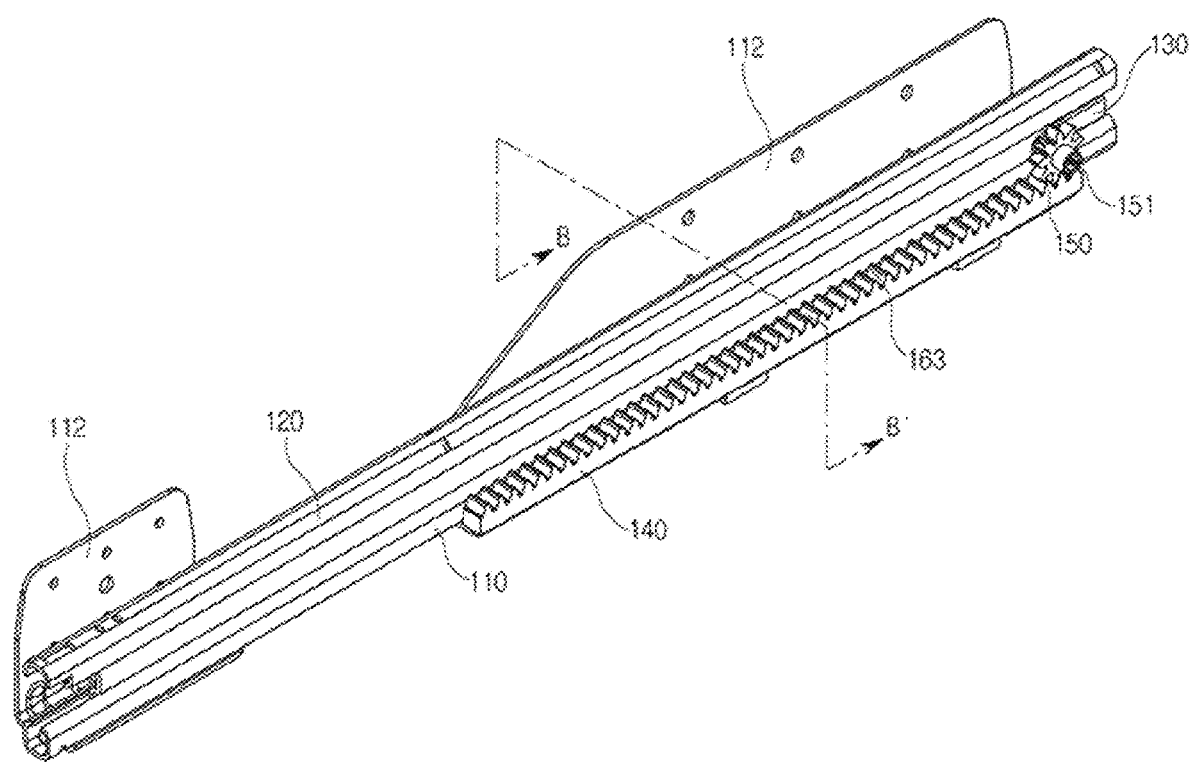
FIG. 6 is a schematic perspective view illustrating a sliding device according to a second embodiment of the present invention.
Figure 7:
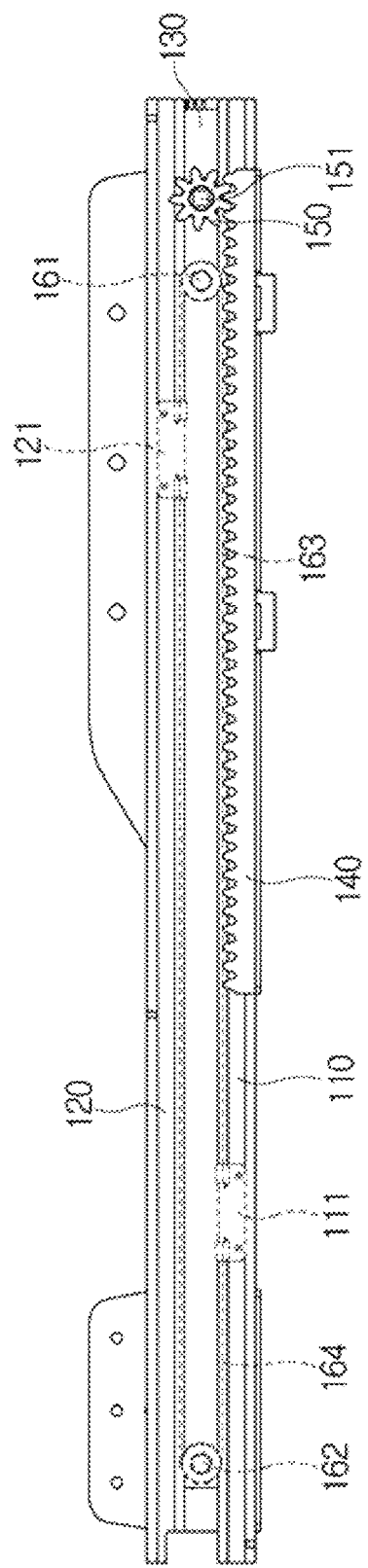
FIG. 7 is a schematic side view illustrating the sliding device according to the second embodiment of the present invention.
Figure 8:
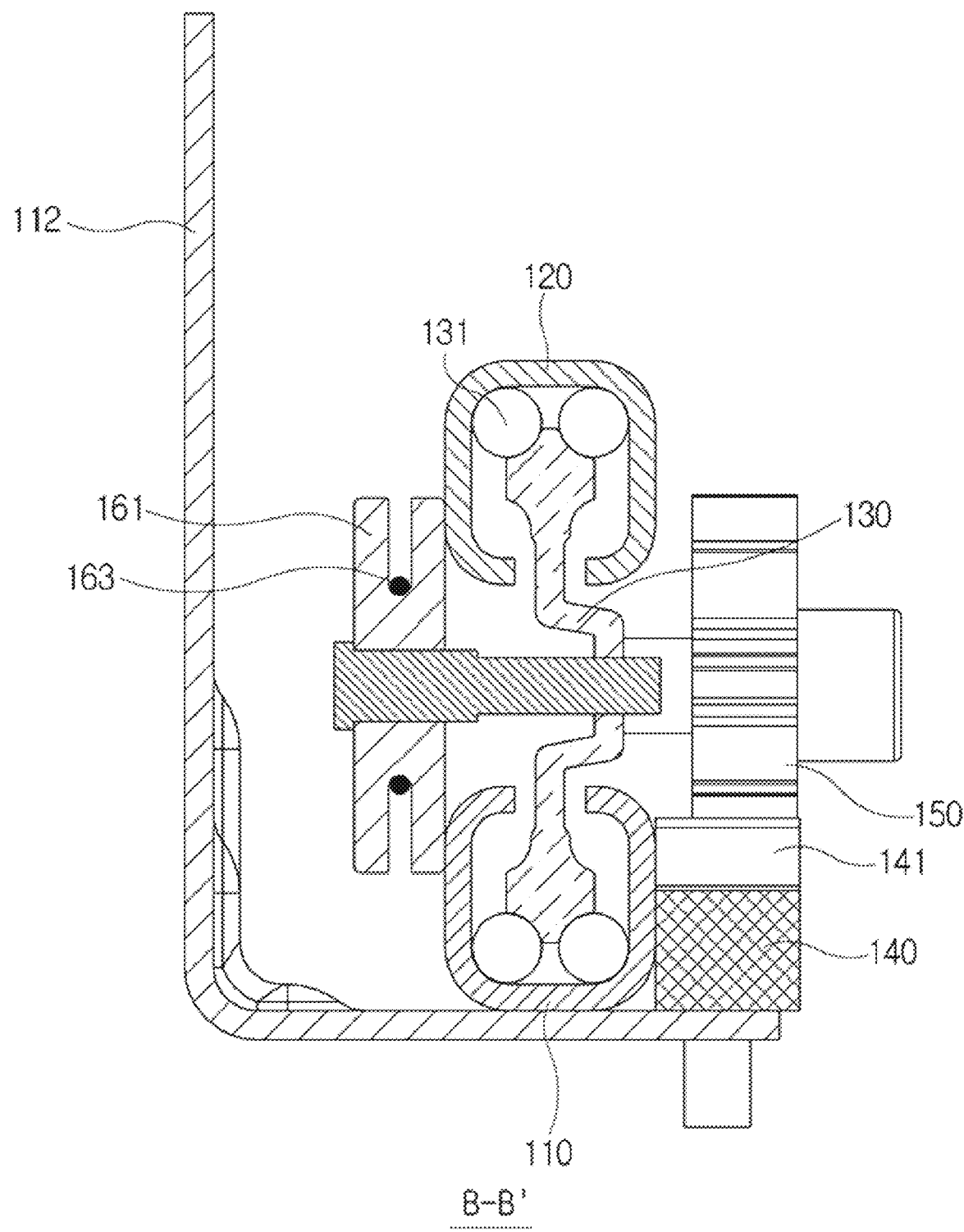
FIG. 8 is a schematic cross-sectional view taken along line B-B' of FIG. 6.
Figure 9:
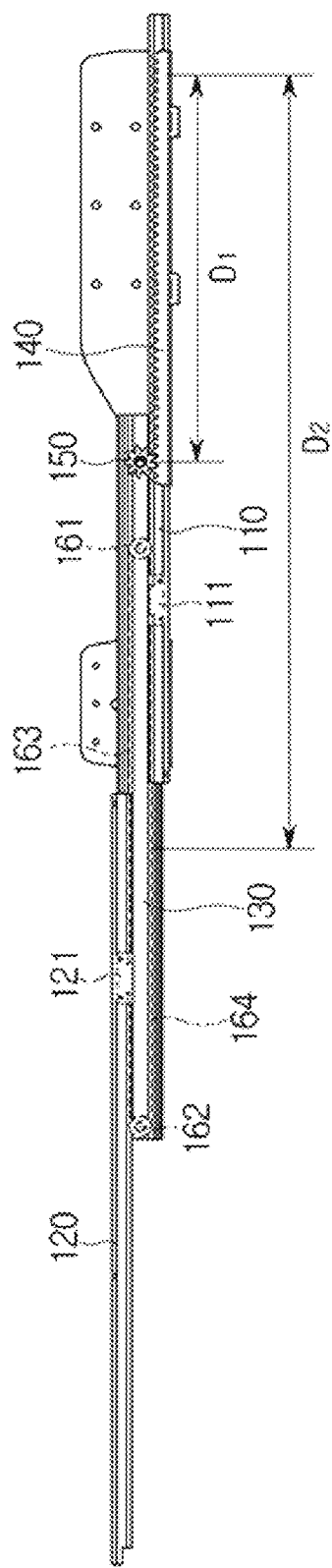
FIG. 9 is a schematic side view illustrating the sliding device according to the second embodiment of the present invention which operated to enter a withdrawn state.
Figure 10:
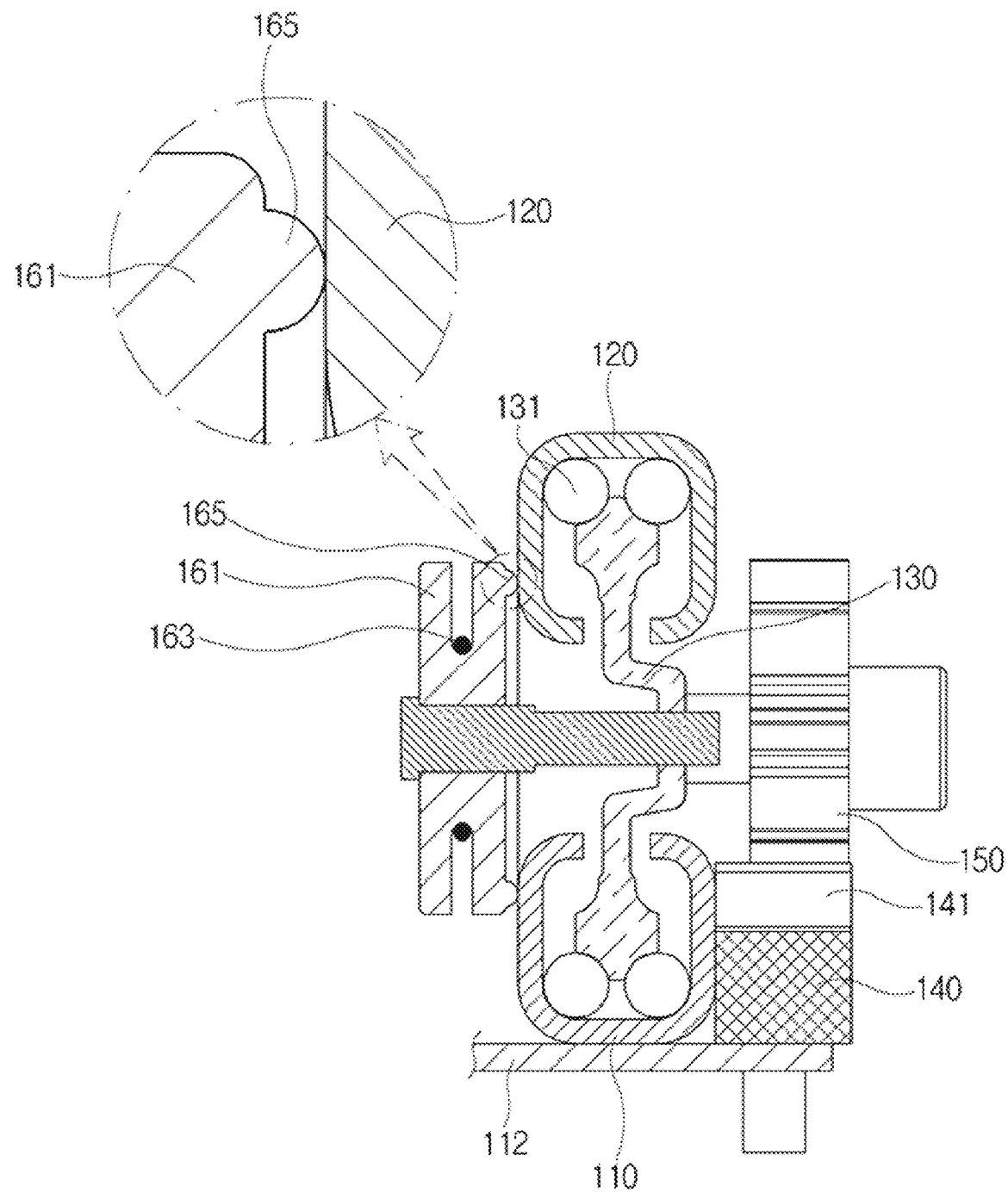
FIG. 10 is a schematic view illustrating another example of a power transmission unit of the sliding device according to the second embodiment of the present invention.
Figure 11:
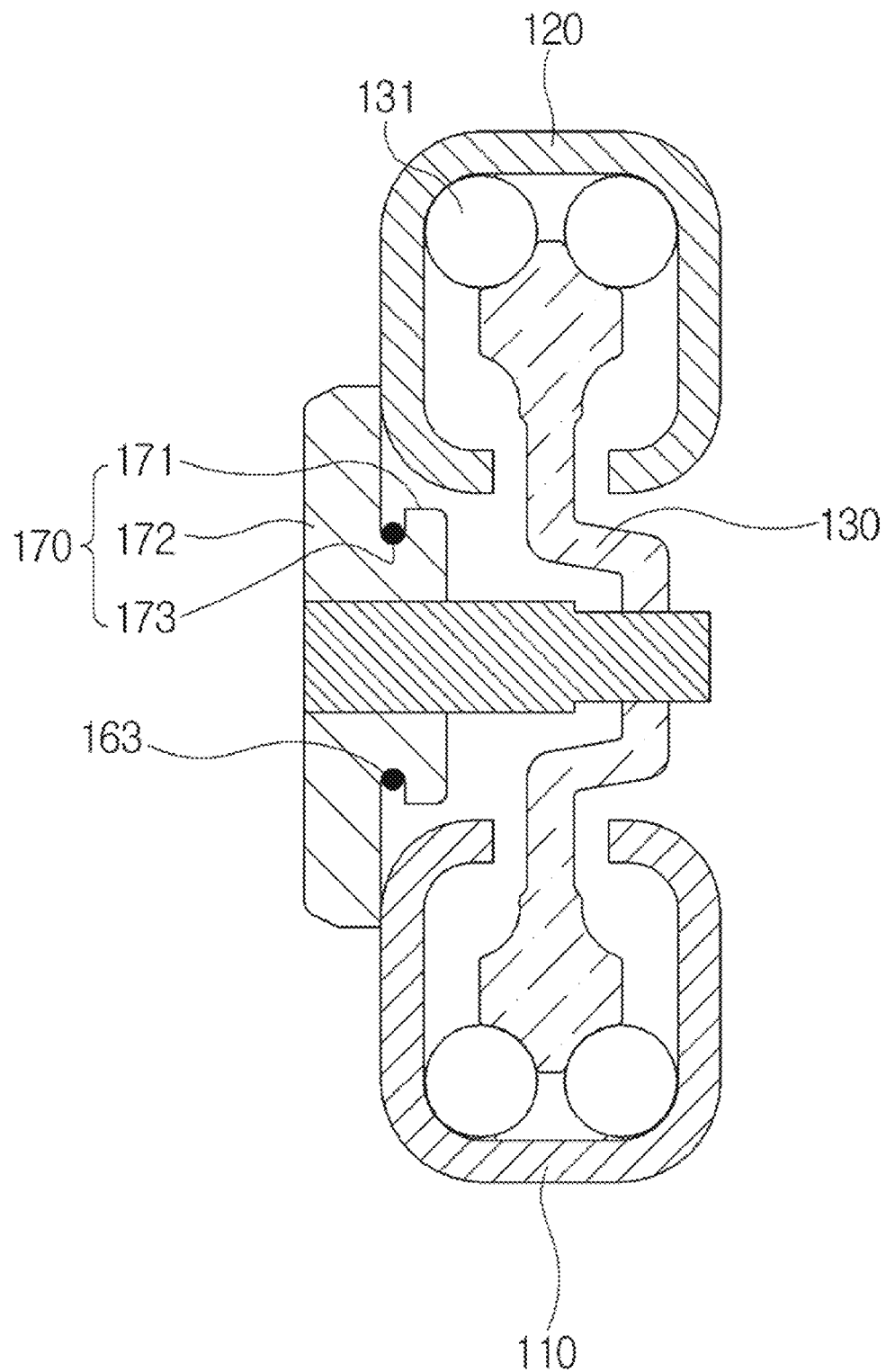
FIG. 11 is a schematic view illustrating still another example of the power transmission unit of the sliding device according to the second embodiment of the present invention.

FIGS. 6 and 7 are schematic perspective and side views illustrating a sliding device according to a second embodiment of the present invention, FIG. 8 is a schematic cross-sectional view taken along line B-B' of FIG. 6, and FIG. 9 is a schematic side view illustrating the sliding device which operated to enter a withdrawn state. In addition, FIGS. 10 and 11 are schematic views illustrating other examples of a power transmission unit of the sliding device.

Referring to FIGS. 6 to 9, the sliding device according to the second embodiment of the present invention is provided to have the same configuration as the sliding device 100 according to the above-described first embodiment, and a first roller 161 and a second roller 162 may be rotatably coupled to a side surface of a middle rail 130 which is opposite to the side surface of the middle rail 130 to which the first and second rollers 161 and 162 are coupled in the first embodiment. That is, as illustrated in FIG. 8, the first roller 161 and the second roller 162 may be disposed on the side surface of the middle rail 130 which is opposite to a side surface on which a pinion gear 150 is disposed. This is to prevent the first roller 161 and the second roller 162 from being interfered with by a rack gear 140. Also, the first roller 161 and the second roller 162 may be disposed to be coplanar with the pinion gear 150.

More specifically, as illustrated in FIG. 8, the first roller 161 and the second roller 162 are provided to have diameters greater than a distance between the movable rail 120 and the fixed rail 110 so as to be disposed in contact with side surfaces of the movable rail 120 and the fixed rail 110. Accordingly, the movable rail 120 and the middle rail 130 can be restricted from moving laterally while moving in a sliding manner.

The first roller 161 and the second roller 162 are disposed on the side surface of the middle rail 130 which is opposite to the side surface coupled to the pinion gear 150. This is because, in a case in which the first roller 161 and the second roller 162 are disposed on the side surface of the middle rail 130 which is a side surface coupled to the pinion gear 150, the first roller 161 and the second roller 162 may interfere with the rack gear 140. However, when a gap is formed to allow the first roller 161 to be disposed between the fixed rail 110 and the rack gear 140 to avoid the interference or a size of the rack gear is adjusted, the first roller 161 and the second roller 162 may also be disposed on the side surface of the middle rail 130 which is the side surface coupled to the pinion gear 150.

In addition, the first roller 161 and the second roller 162 may further include protrusions protruding toward the movable rail 120 and the fixed rail 110 to be in line contact with the movable rail 120 and the fixed rail 110.

That is, as illustrated in FIG. 10, a protrusion 165 having a semicircular shape protruding outward is formed on a side surface of the first roller 161, and the protrusion 165 is in contact with the movable rail 120 and the fixed rail 110. Accordingly, a contact surface between the protrusion 165 and the movable rail 120 and the fixed rail 110 can be minimized so that a frictional force can be reduced. Although only the protrusion 165 formed on the first roller 161 is illustrated in FIG. 10, a protrusion may also be formed on the second roller in the same way.

In addition, as illustrated in FIG. 11, a first roller 170 includes a first flange 171 provided to have a diameter less than a distance between the movable rail 120 and the fixed rail 110 and disposed between the movable rail 120 and the fixed rail 110, a second flange 172 formed to be spaced apart from the first flange 171, provided to have a diameter greater than the distance between the movable rail 120 and the fixed rail 110, and disposed in contact with side surfaces of the movable rail 120 and the fixed rail 110, and a guide groove 173 which is formed between the first flange 171 and the second flange 172 and on which a first wire 163 is wound.

Accordingly, since a protruding extent of the first roller 170 in an outward direction can be reduced, a size of a sliding device can be minimized, and interference with the other components can also be minimized.

The first roller 170 is disposed on the side surface of the middle rail 130 which is opposite to the side surface coupled to the pinion gear 150 in FIG. 11 but is not limited thereto and may also be disposed on a side surface of the middle rail 130 to which the pinion gear 150 is coupled. In this case, the size of the rack gear may be adjusted so that the first roller 170 and the rack gear 140 do not interfere with each other.

In addition, only the first roller 170 is illustrated in FIG. 11, but a second roller may be provided in the same way.

Figure 12:
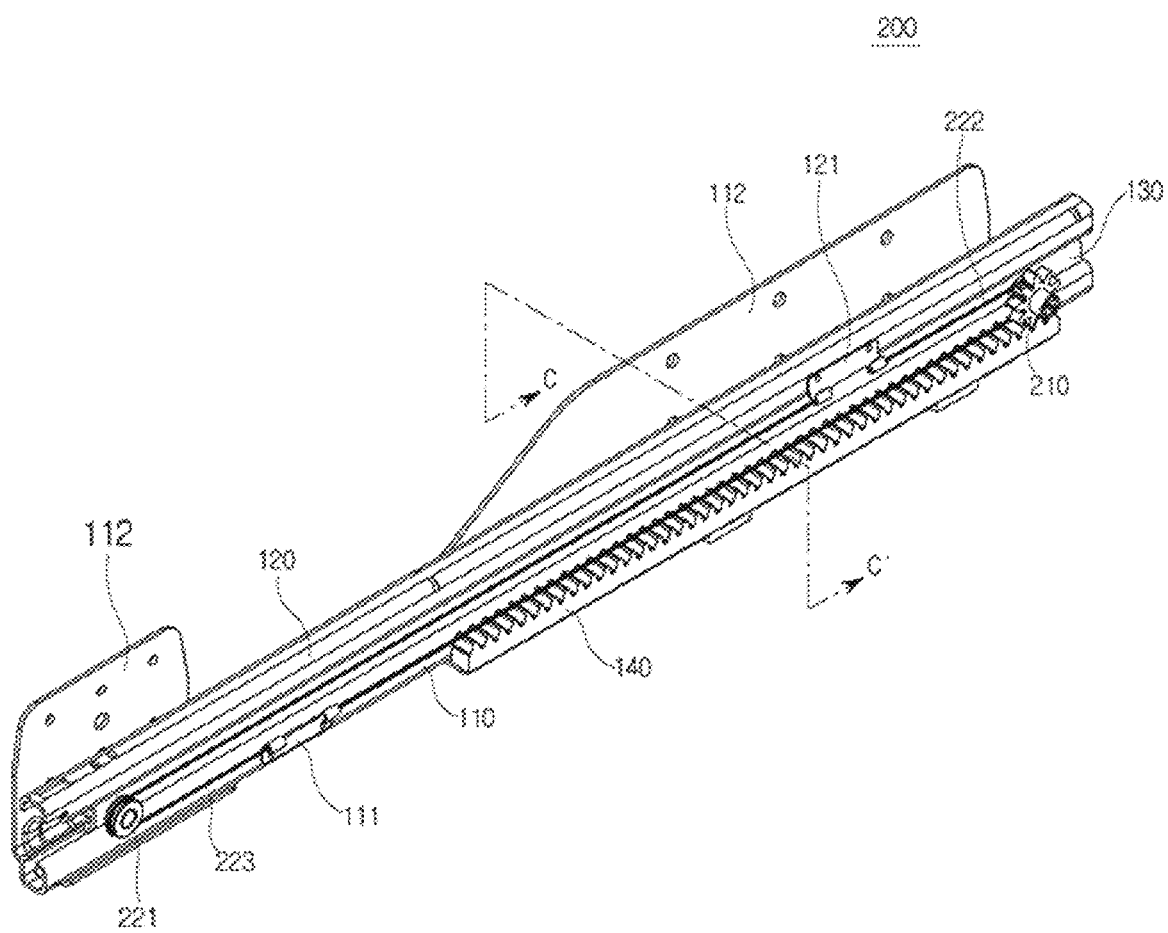
FIG. 12 is a schematic perspective view illustrating a sliding device according to a third embodiment of the present invention.
Figure 13:
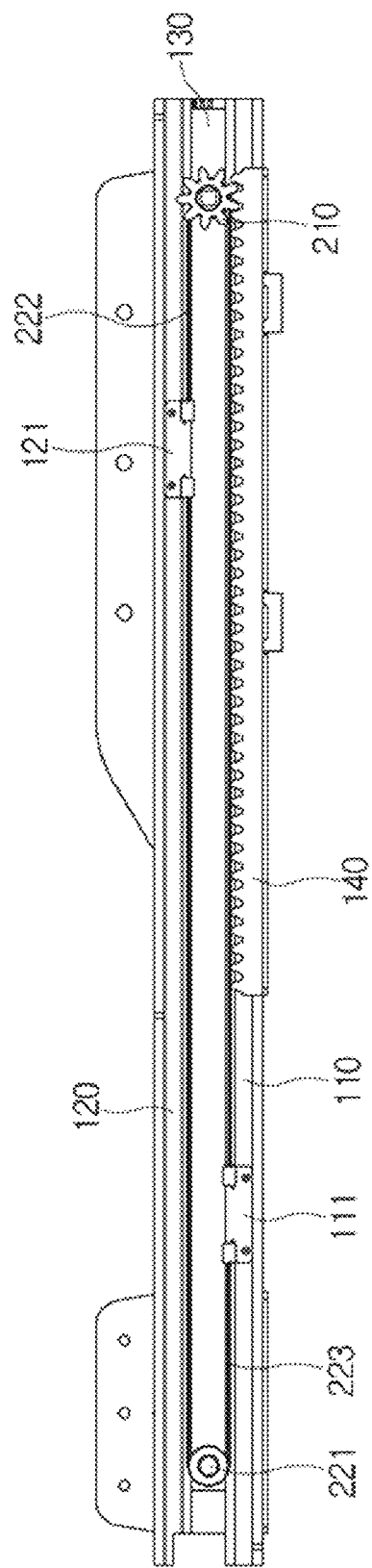
FIG. 13 is a schematic side view illustrating the sliding device according to the third embodiment of the present invention.
Figure 14:
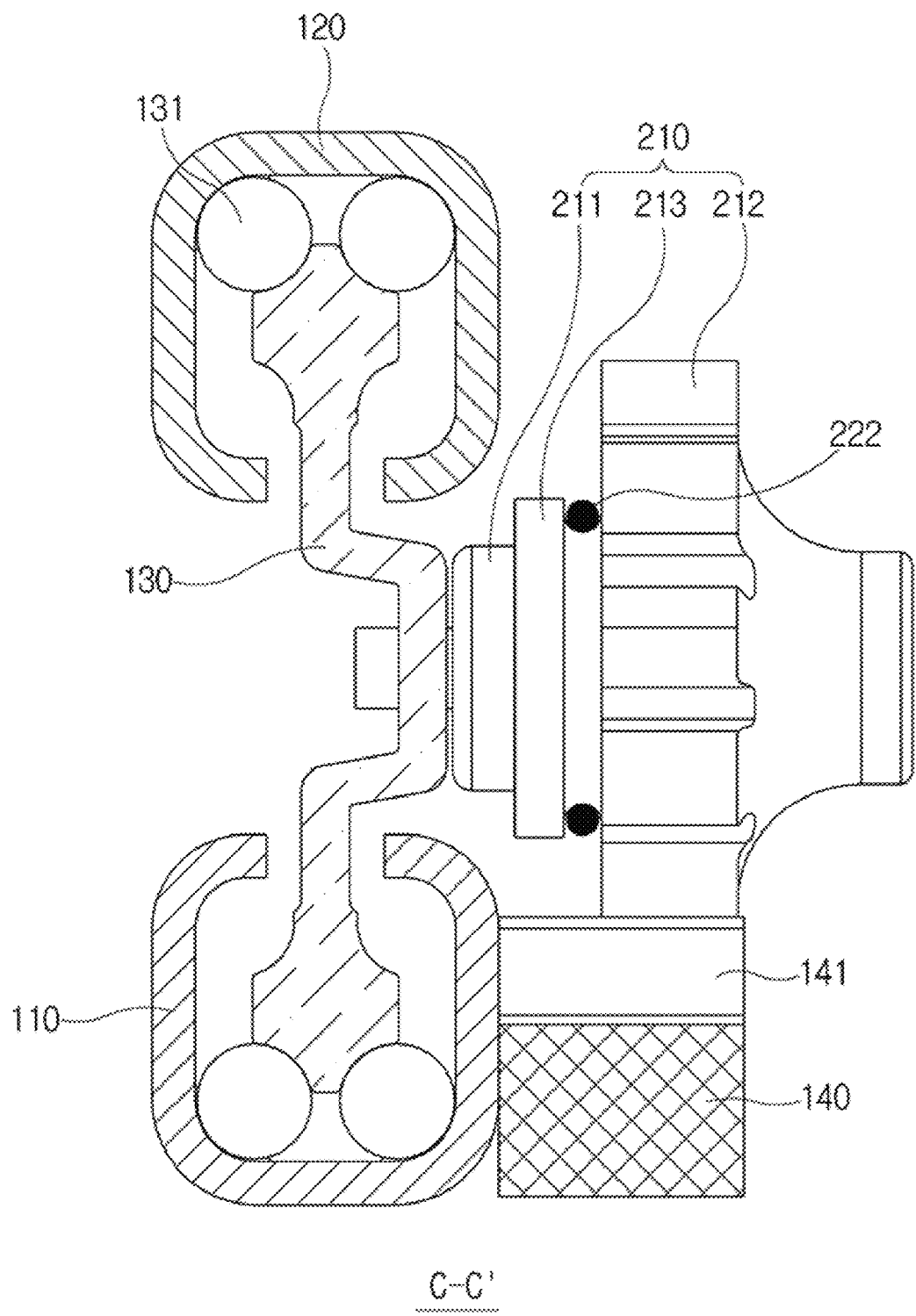
FIG. 14 is a schematic cross-sectional view taken along line C-C' of FIG. 12.

FIGS. 12 and 13 are schematic perspective and side views illustrating a sliding device according to a third embodiment of the present invention, FIG. 14 is a schematic cross-sectional view taken along line C-C' of FIG. 12, and FIGS. 15 to 19 are schematic views illustrating other examples of a pinion gear of the sliding device.

Since components of a sliding device 200 according to the third embodiment of the present invention of which reference numerals are the same as the reference numerals of the components of the sliding device 100 according to the first embodiment illustrated in FIGS. 1 to 4 are the same as the components of the sliding device 100, detailed descriptions thereof will be omitted. That is, a driving part of the sliding device 200 according to the third embodiment is partially different from the driving part of the sliding device 100 according to the first embodiment.

Referring to FIGS. 12 to 14, the driving part of the sliding device 200 includes a driving unit configured to move a middle rail 130, and a power transmission unit associated with the middle rail 130 and a movable rail 120 and configured to move the movable rail 120 by twice a moving distance of the middle rail.

In this case, the driving unit includes a rack gear 140 installed on a fixed rail 110 and a pinion gear 210 which is rotatably installed at one side of the middle rail 130, is engaged with the rack gear 140, and receives rotational power of a driving motor to move the middle rail 130.

In addition, the power transmission unit includes a roller 221 rotatably coupled to the other side of the middle rail 130, a first wire 222 of which one side end is coupled to the movable rail 120 and the other side end is coupled to the fixed rail 110 and which is disposed to surround a rotating shaft of the pinion gear 210, and a second wire 223 of which one side end is coupled to the movable rail 120 and the other side end is coupled to the fixed rail 110 and which is disposed to surround the roller 221.

That is, in the sliding device 200 according to the third embodiment, the first wire 222 may be provided to be wound on the pinion gear 210, and only one roller may be used.

More specifically, a first coupling unit 121 is fixedly coupled to the movable rail 120 and a second coupling unit 111 is fixedly coupled to the fixed rail 110. That is, in a state in which one side end of the first wire 222 is coupled to the first coupling unit 121, after the first wire 222 surrounds the pinion gear 210, the other side end thereof is coupled to the second coupling unit 111. In addition, in a state in which one side end of the second wire 223 is coupled to the first coupling unit 121, after the second wire 223 surrounds the roller 221, the other side end thereof is coupled to the second coupling unit 111.

To this end, the pinion gear 210 extends from a rotating shaft 211 in a radial direction, and a flange part 213 is formed to be spaced a predetermined distance from a gear part 212. Due to such a configuration, a gap is formed between the gear part 212 and the flange part 213, and in this case, the first wire 222 is disposed to be inserted into the gap.

Figure 15:
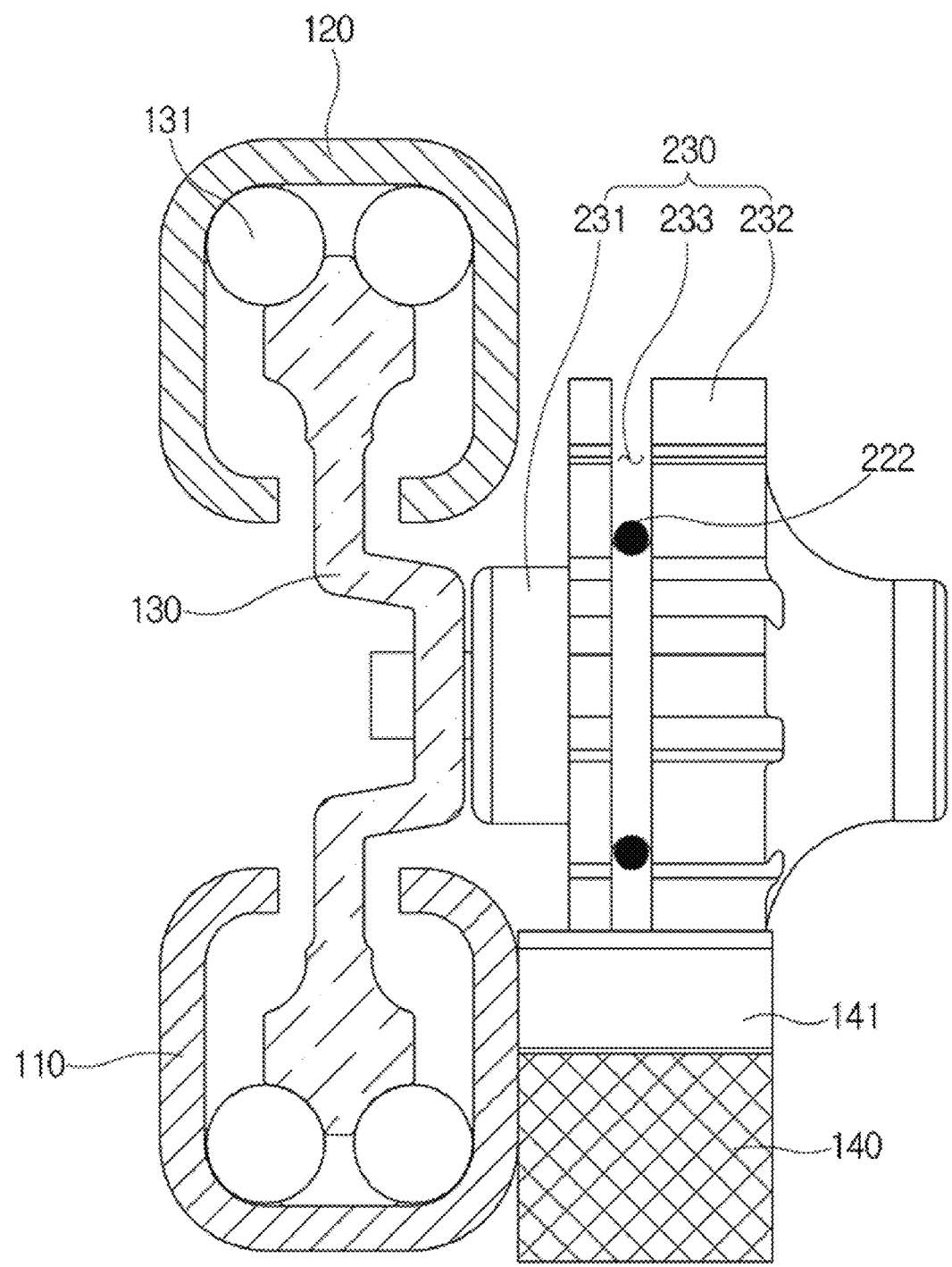
FIGS. 15 to 19 are schematic views illustrating other examples of a pinion gear of the sliding device according to the third embodiment of the present invention.

Alternatively, as illustrated in FIG. 15, a guide slit 233 is formed in a gear part 232 of a pinion gear 230 in a circumferential direction, and the first wire 222 may be disposed to be inserted into the guide slit 233. Due to such a configuration, since the pinion gear 230 is gear-coupled to the rack gear 140 in a state in which the first wire 222 is disposed to be inserted into the guide slit 233 formed in the gear part 232, the first wire 222 can be prevented from being separated therefrom.

Figure 16:
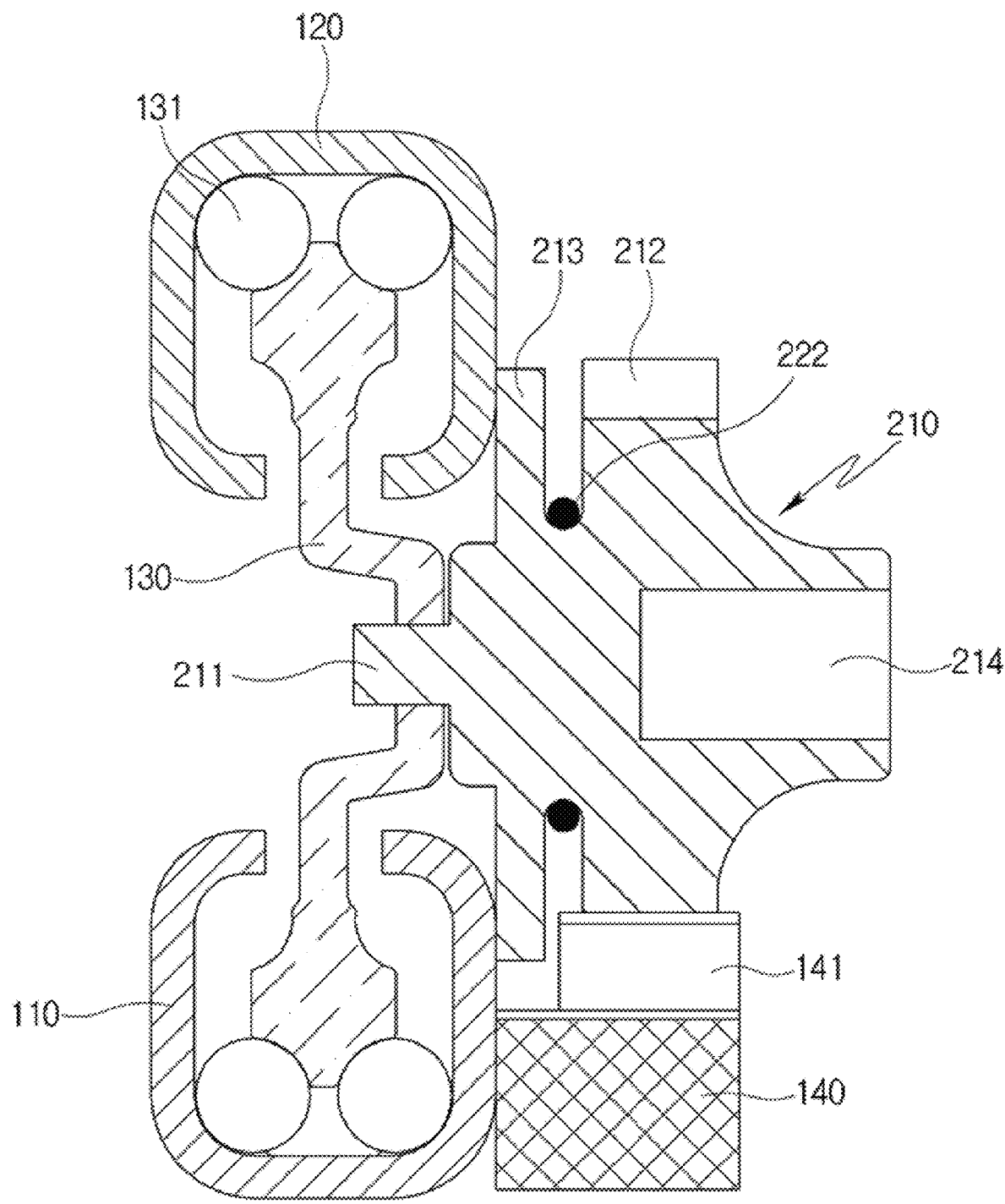

In addition, as illustrated in FIG. 16, a flange part 213 may be provided to have a diameter greater than a distance between the movable rail 120 and the fixed rail 110 and may be disposed in contact with side surfaces of the movable rail 120 and the fixed rail 110. Accordingly, the movable rail 120 and the middle rail 130 can be restricted from moving laterally while moving in a sliding manner.

In this case, although not illustrated in the drawing, the roller 221 may also be provided to have the same diameter as the flange part 213 and disposed in contact with the side surfaces of the movable rail 120 and the fixed rail 110.

Figure 17:
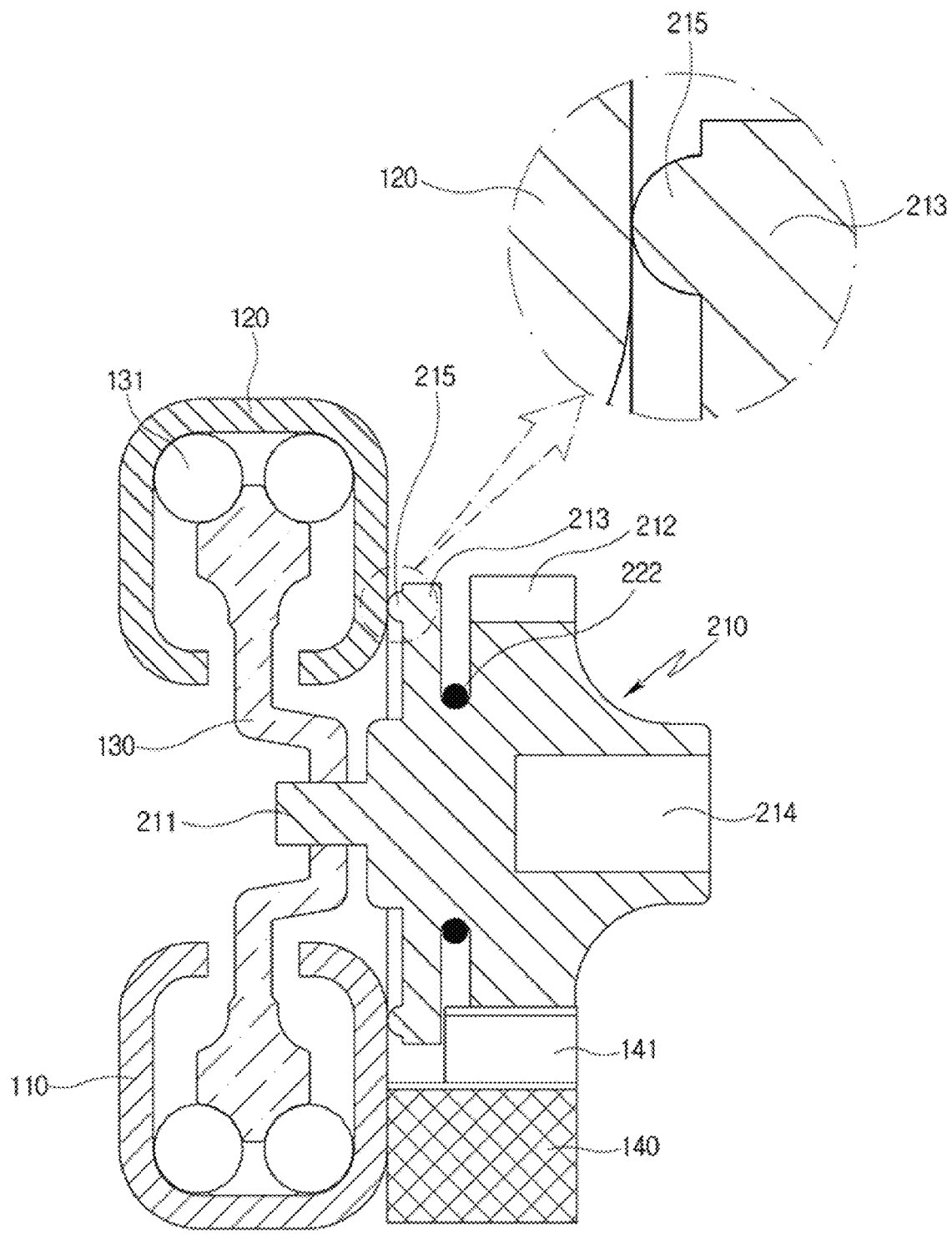

In addition, as illustrated in FIG. 17, a flange part 213 may formed to further include a protrusion 215 protruding toward the movable rail 120 and the fixed rail 110 to be in line contact with the movable rail 120 and the fixed rail 110.

That is, the protrusion 215 having a semicircular shape protruding outward from a side surface of the flange part 213 is formed, and the protrusion 215 is in contact with the movable rail 120 and the fixed rail 110. Accordingly, a contact surface between the flange part 213 and the movable rail 120 and the fixed rail 110 may be minimized to reduce a fractional force. Although only the protrusion 215 formed on the flange part 213 of the pinion gear 210 is illustrated in FIG. 17, a protrusion may also be formed on the roller in the same way.

Figure 18:
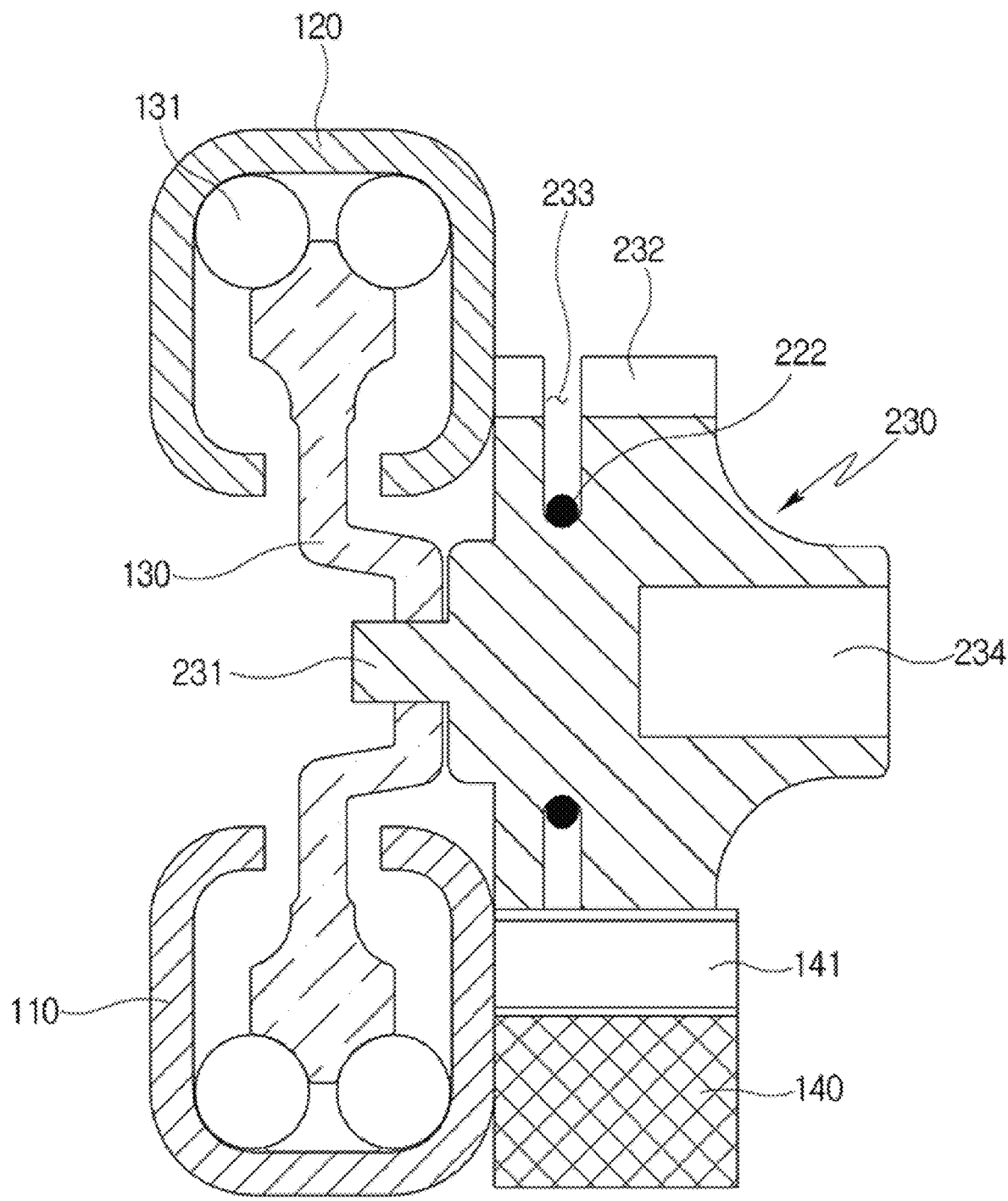

In addition, as illustrated in FIG. 18, a guide slit 233 may be formed in a gear part 232 of a pinion gear 230 in a circumferential direction, and the first wire 222 may be disposed to be inserted into the guide slit 233. Due to such a configuration, since the pinion gear 230 is gear-coupled to the rack gear 140 in a state in which the first wire 222 is disposed to be inserted into the guide slit 233 formed in the gear part 232, the first wire 222 can be prevented from being separated from the pinion gear.

In this case, since the pinion gear 230 is provided to have a diameter greater than a distance between the movable rail 120 and the fixed rail 110 and disposed in contact with side surfaces of the movable rail 120 and the fixed rail 110, the movable rail 120 and the middle rail 130 may be restricted from moving laterally while moving in a sliding manner.

Figure 19:
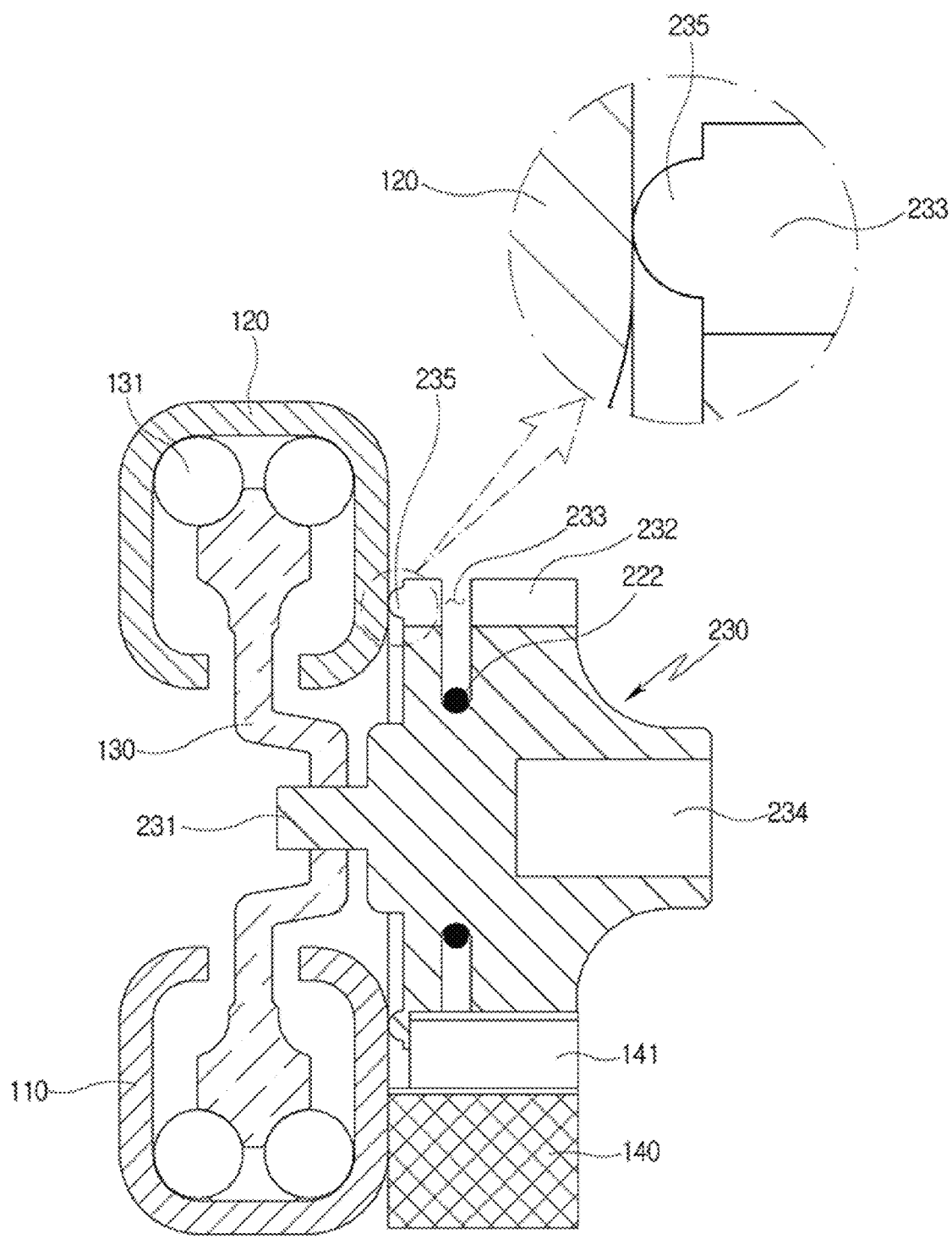

In addition, as illustrated in FIG. 19, a pinion gear 230 may be formed to further include a protrusion 235 protruding toward the movable rail 120 and the fixed rail 110 so that the protrusion 235 is in line contact with the movable rail 120 and the fixed rail 110.

The sliding device according to the first to third embodiments further includes a stopper configured to restrict the pinion gear from further rotating on the rack gear so as to prevent a drawer body from being separated from the body.

Figure 20:
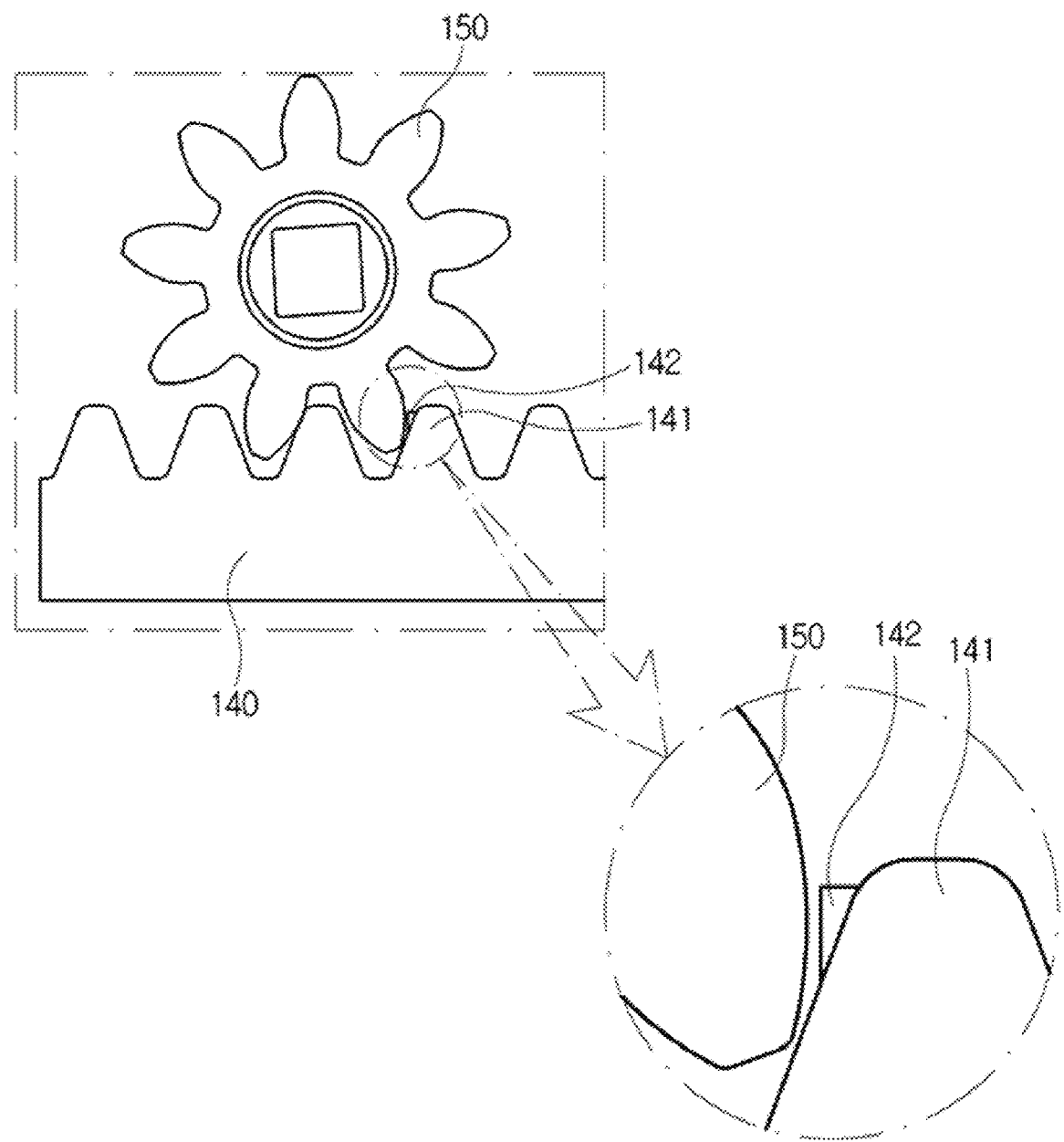
FIG. 20 is a schematic view illustrating a stopper formed on a rack gear of the sliding device according to the first embodiment to the third embodiment.

FIG. 20 is a schematic view illustrating the stopper formed on the rack gear of the sliding device according to the first embodiment to the third embodiment.

Referring to FIG. 20, a stopper 142 is formed to protrude from the gear part 141 at which the movable rail reaches a maximum withdrawn position on the rack gear 140 to restrict the pinion gear 150 from further rotating in a direction in which the movable rail is withdrawn.

In addition, the sliding device according to the third embodiment of the present invention may further include an automatic closing part configured to close the storage body when the storage body is opened or closed.

Figure 21:
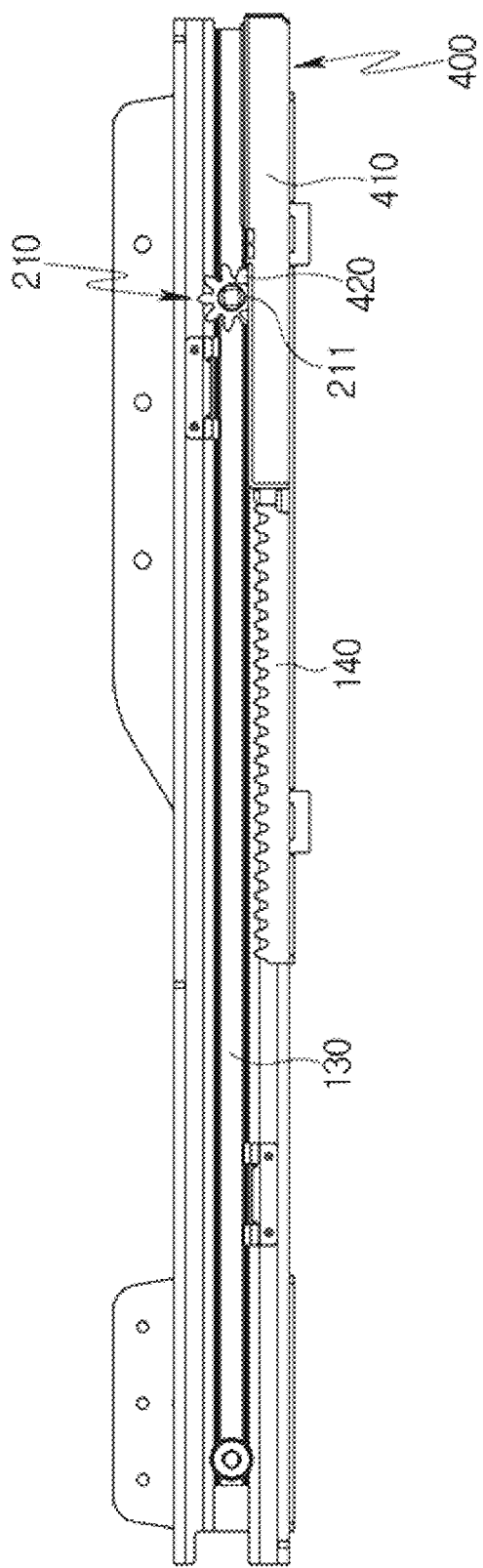
FIG. 21 is a schematic view illustrating a state in which an automatic closing part is further provided in the sliding device according to the third embodiment of the present invention.

FIG. 21 is a schematic view illustrating a state in which the automatic closing part is further provided in the sliding device according to the third embodiment of the present invention.

Referring to FIG. 21, an automatic closing part 400 includes a housing body 410 disposed on a side surface of the rack gear 140 and a hook 420 disposed in the housing body 410 and hooked to the rotating shaft 211 protruding outward from the pinion gear 210 provided in the middle rail 130 when the middle rail 130 moves in a closing direction.

That is, when the storage body moves in a direction in which the storage body is opened, the rotating shaft 211 of the pinion gear 210 is unhooked from the hook 420, and when the storage body moves in a direction in which the storage body is closed, the rotating shaft 211 of the pinion gear 210 is hooked to the hook 420, and the storage body may be automatically moved to a closing position.

In this case, since the automatic closing part is a conventionally used apparatus, the detailed configuration and operations thereof will be omitted.

Figure 22:
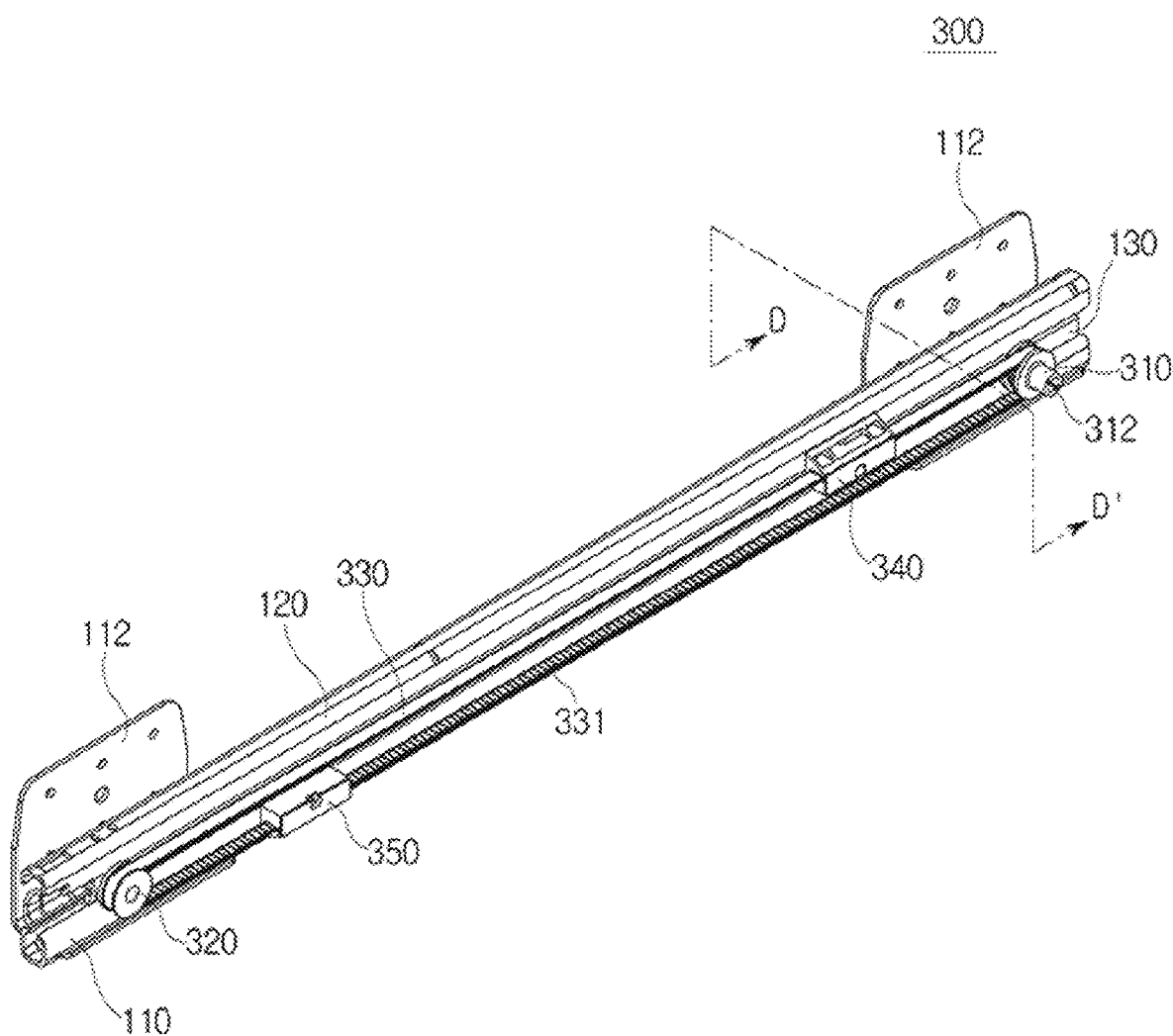
FIG. 22 is a schematic perspective view illustrating a sliding device according to a fourth embodiment of the present invention.
Figure 23:
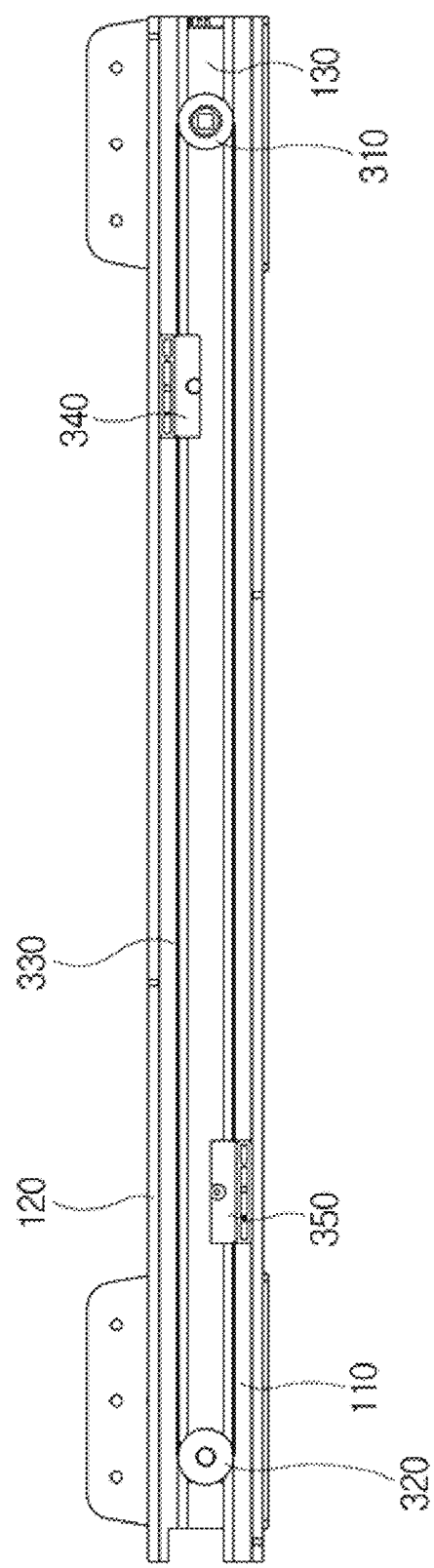
FIG. 23 is a schematic side view illustrating the sliding device according to the fourth embodiment of the present invention.
Figure 24:
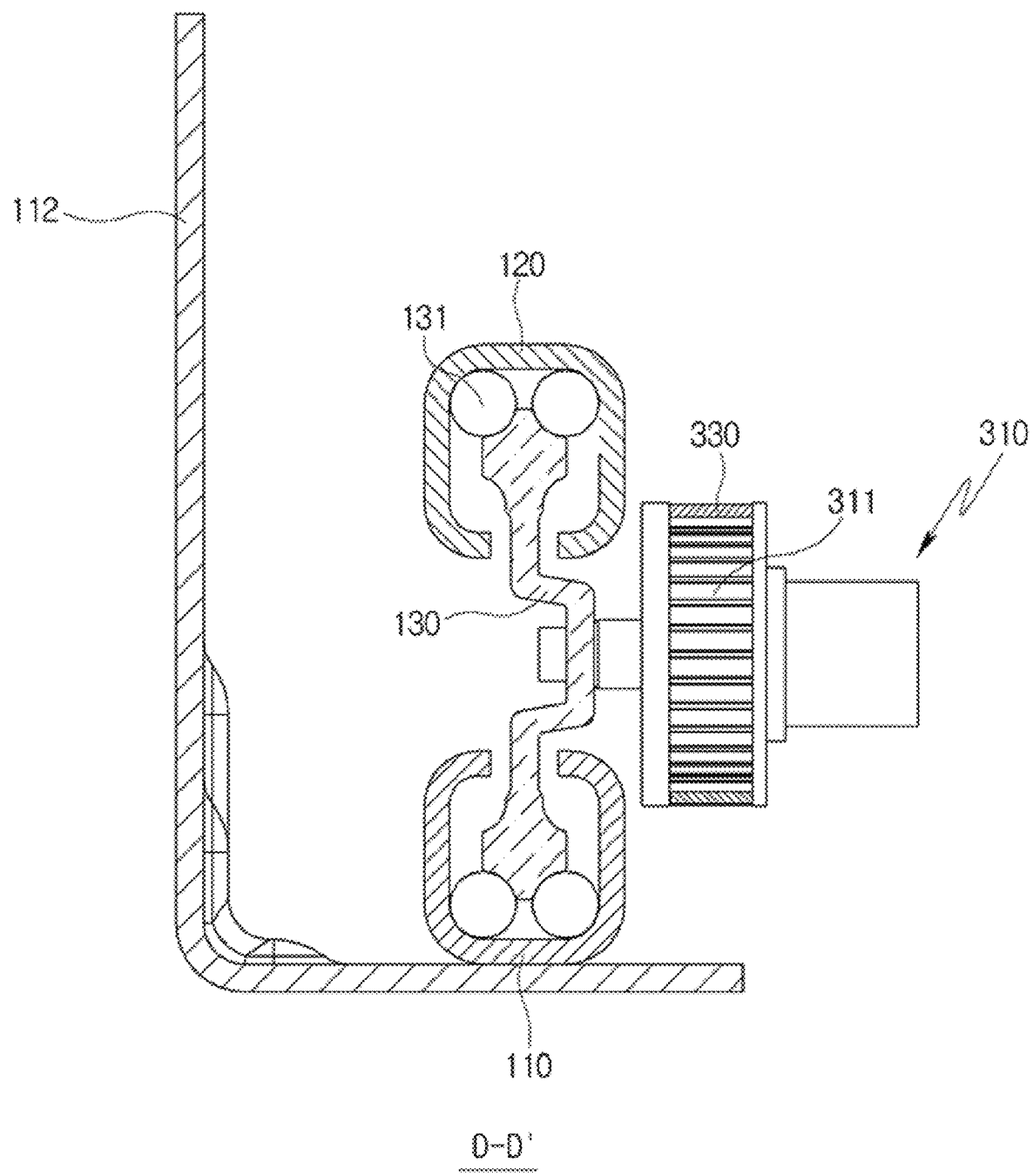
FIG. 24 is a schematic cross-sectional view taken along line D-D' of FIG. 21.
Figure 25:
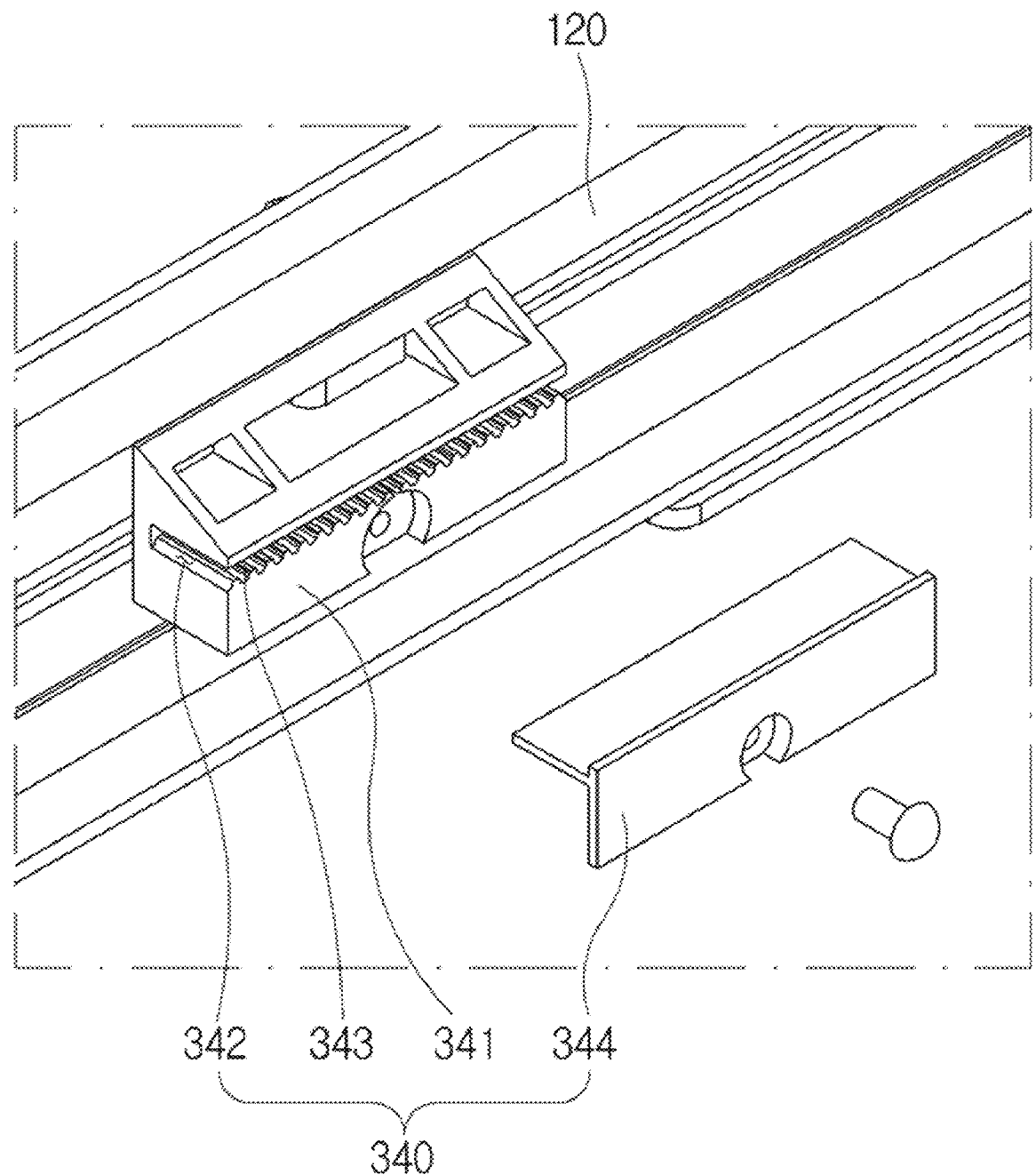
FIG. 25 is an exploded schematic perspective view illustrating a first fixed portion of the sliding device according to the fourth embodiment of the present invention.

FIGS. 22 and 23 are schematic perspective and side views illustrating a sliding device according to a fourth embodiment of the present invention, FIG. 24 is a schematic cross-sectional view taken along line D-D' of FIG. 21, and FIG. 25 is an exploded schematic perspective view illustrating a first fixed portion of the sliding device.

Since components of a sliding device 300 according to the fourth embodiment of the present invention of which reference numerals are the same as the reference numerals of the components of the sliding device 100 according to the first embodiment illustrated in FIGS. 1 to 4 are the same as the components of the sliding device 100, detailed descriptions thereof will be omitted. That is, a driving part of the sliding device 300 according to the fourth embodiment is partially different from the driving part of the sliding device 100 according to the first embodiment.

Referring to FIGS. 22 to 25, the driving part of the sliding device 300 according to the fourth embodiment of the present invention includes a driving roller 310 which is rotatably coupled to one side of a middle rail 130, has an outer circumferential surface on which gear teeth 311 are formed and receives rotational power of a driving motor to rotate, a guide roller 320 which is rotatably coupled to the other side of the middle rail 130 and has an outer circumferential surface on which gear teeth 321 are formed, a belt 330 having an inner circumferential surface on which gear teeth 331 are formed, wherein the gear teeth 331 are engaged with the gear teeth 311 and 321 of the driving roller 310 and the guide roller 320, a first fixed portion 340 which is provided on a movable rail 120 and to which one side of the belt 330 positioned at a side of the movable rail 120 is fixedly coupled, and a second fixed portion 350 which is provided on a fixed rail 110 and to which the other side of the belt 330 positioned at a side of the fixed rail 110 is fixedly coupled.

Due to such a configuration, when the driving motor is operated to rotate the driving roller 310, the belt 330 is rotated to move the driving roller 310 with the middle rail 130, and the movable rail 120 is moved together due to movement of the belt 330 fixedly coupled to the first fixed portion 340. In this case, a moving distance of the movable rail 120 is twice a moving distance of the middle rail 130.

That is, in the sliding device 300 according to the fourth embodiment, a rack gear and a pinion gear are not used, the gear teeth are formed on the roller, and the belt is used instead of a wire so that the same effect can be achieved while the number of components is decreased.

In addition, since gear teeth are formed on the first fixed portion 340 and the second fixed portion 350 to be engaged with the gear teeth 331 of the belt 330, the first fixed portion 340 and the second fixed portion 350 and the belt 330 can be coupled without an additional coupling member.

More specifically, referring to FIG. 25, the first fixed portion 340 includes a fixed portion body 341 coupled to the movable rail 120, a slit groove 342 which is formed in the fixed portion body 341 and into which the belt 330 is inserted, gear teeth 343 formed on the slit groove 342 to be engaged with the gear teeth 331 of the belt 330, and a coupling member 344 which is inserted into and coupled to the slit groove 342 to press and couple the gear teeth 331 of the belt 330 and the gear teeth 343 formed on the slit groove 342 so that the gear teeth 331 of the belt 330 are engaged with and do not separate from the gear teeth 343 of the slit groove 342 in a state in which the belt 330 is inserted into the slit groove 342.

In addition, although not illustrated in the drawing, a configuration of the second fixed portion 350 is provided to the configuration of the first fixed portion 340 in the same way.

Due to such configurations of the first and second fixed portions 340 and 350, the belt 330 provided to have any shape can also be easily coupled thereto. That is, the belt 330 may be provided in a two-band type, surround the driving roller 310 and the guide roller 320, and be coupled thereto. Alternatively, the belt 330 may be provided in a one-band type, surround the driving roller 310 and the guide roller 320, and be inserted into any one fixed portion, and both end portions of the belt 330 may be inserted into and coupled to another fixed portion. Alternatively, even when the belt 330 is provided as a caterpillar type, the belt 330 may surround the driving roller 310 and the guide roller 320 and may be inserted into and coupled to two fixed portions.

As described above, although the present invention has been shown and described with respect to the few specific embodiments and drawings, those skilled in the art should appreciate that various modifications and changes may be made in the technical concept of the present invention, the scope of which is defined in the claims and their equivalents.

The invention claimed is:

1. A sliding device comprising:
   a fixed rail configured to be fixed to a base body into which a storage body is to be inserted;
   a movable rail fixed to the storage body;
   a middle rail disposed between the movable rail and the fixed rail and configured to move relatively with respect to the movable rail and the fixed rail;
   a driving motor configured to move the middle rails;
   a rack gear disposed on the fixed rail;
   a pinion gear rotatably disposed at one side of the middle rail and engaged with the rack gear, the pinion gear being configured to receive rotational power of the driving motor;
   a roller rotatably coupled to another side of the middle rail, the roller being disposed apart from the pinon gear along the middle rail;
   a first wire having a first side end coupled to the movable rail and a second side end coupled to the fixed rail and surrounding a rotating shaft of the pinion gear; and
   a second wire having a first side end coupled to the movable rail and a second side end coupled to the fixed rail and surrounding the roller.

2. The sliding device of claim 1, wherein the rack gear includes a stopper protruding from a gear part at which the movable rail reaches a maximum withdrawn position to restrict the pinion gear from further rotating in a direction in which the movable rail is withdrawn.

3. The sliding device of claim 1, wherein the pinion gear includes a flange part and a gear part,
   wherein the flange part extends from the rotating shaft in a radial direction and is spaced a predetermined distance from the gear part, and
   wherein the first wire is disposed between the gear part and the flange part.

4. The sliding device of claim 3, wherein the flange part has a diameter greater than a distance between the movable rail and the fixed rail and is disposed in contact with side surfaces of the movable rail and the fixed rail.

5. The sliding device of claim 4, wherein the flange part includes a protrusion protruding toward the movable rail and the fixed rail to be in line contact with the movable rail and the fixed rail.

6. The sliding device of claim 3, wherein the gear part has a guide slit formed in a circumferential direction, and
   wherein the first wire is disposed in the guide slit.

7. The sliding device of claim 1, further comprising an automatic closing part which is hooked to the rotating shaft protruding outward from the pinion gear or unhooked from the rotating shaft to automatically close the middle rail when the middle rail is opened or closed.

* * * * *